United States Patent
Burtnyk et al.

(10) Patent No.: US 7,589,732 B2
(45) Date of Patent: Sep. 15, 2009

(54) SYSTEM AND METHOD OF INTEGRATED SPATIAL AND TEMPORAL NAVIGATION

(75) Inventors: Nicolas Burtnyk, Toronto (CA); Azam Khan, Aurora (CA); George William Fitzmaurice, Toronto (CA); Ravin Balakrishnan, Toronto (CA); Gordon Paul Kurtenbach, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 628 days.

(21) Appl. No.: 10/287,816

(22) Filed: Nov. 5, 2002

(65) Prior Publication Data

US 2004/0085335 A1     May 6, 2004

(51) Int. Cl.
*G06T 15/00* (2006.01)
(52) U.S. Cl. ...................................... 345/474; 345/676
(58) Field of Classification Search ................. 345/676, 345/419, 474, 473, 475
See application file for complete search history.

(56) References Cited

U.S. PATENT DOCUMENTS

| | | | | |
|---|---|---|---|---|
| 4,282,546 | A | * | 8/1981 | Reitmeier .................... 348/580 |
| 5,276,785 | A | | 1/1994 | Mackinlay et al. .......... 345/427 |
| 6,028,584 | A | | 2/2000 | Chiang et al. ............... 345/628 |
| 6,091,422 | A | | 7/2000 | Ouaknine et al. ........... 345/419 |
| 6,144,375 | A | | 11/2000 | Jain et al. .................... 345/420 |
| 6,204,850 | B1 | | 3/2001 | Green ......................... 715/850 |
| 6,271,855 | B1 | | 8/2001 | Shum et al. ................. 345/427 |
| 6,346,938 | B1 | | 2/2002 | Chan et al. .................. 345/419 |
| 6,466,254 | B1 | * | 10/2002 | Furlan et al. ................ 348/36 |
| 6,795,972 | B2 | * | 9/2004 | Rovira ......................... 725/40 |
| 2004/0210852 | A1 | | 10/2004 | Blakrishnan et al. ........ 715/856 |

OTHER PUBLICATIONS

Hanson et al., Constrained Navigation Environments, Dagstuhl, pp. 95-104.*

(Continued)

*Primary Examiner*—Phu K Nguyen
(74) *Attorney, Agent, or Firm*—Staas & Halsey LLP

(57) ABSTRACT

The system displays an image portraying a virtual space as viewed by a virtual camera at a first location on a spatially navigable camera surface within the virtual space. A user begins a drag operation. Based on the dragging, the virtual camera is spatially translated from the first location on the spatially navigable region to a second location on the spatially navigable region. The orientation of the virtual camera at the second location may be automatically set to either point towards the pre-defined look-at point or to point in a direction normal to the spatially navigable region at the second location. The system then displays an image portraying the virtual space in accordance with the location and orientation of the virtual camera at the second location in the spatially navigable camera surface. While the drag operation continues, the system determines that further translating the virtual camera would place the virtual camera beyond the spatially navigable region. In response, the system begins displaying a transition, which may be an interpolated animation of the virtual camera, an animation semi-transparently blended with a slate, a pre-authored animation of the virtual camera, or other visual effect. While further continuing to drag, and based on the same, the system either advances display of the transition, reverses display of the transition, or otherwise temporally controls the display of the transition.

46 Claims, 23 Drawing Sheets

OTHER PUBLICATIONS

Dennis et al., Assisted Navigation for Large Information Spaces, IEEE, Oct. 2002, pp. 419-426.*

Tsang et al., Game-Like Navigation and Responsiveness in non-game applications, Communication of the ACM, Jul. 2003, vol. 46, No. 7, pp. 56-61.*

Burtnyk, Nicholas et al., "StyleCam: Interactive Stylized 3D Navigation using Integrated Spatial & Temporal Control", Letters CHI, vol. 4, Issue 2, Oct. 2002, pp. 101-110.

Hanson, Andrew et al., "Constrained 3D Navigation with 2D Controllers", Computer Science Department, Indiana University, Bloomington, IN, 9pp IEEE, Visualization $8^{th}$ conference, Oct. 1997, pp. 175-183.

Khan, Azam et al., "Interaction: HoverCam: interactive 3D navigation for proximal object inspection", Proceedings of the 2005 symposium on interactive 3D graphics and games, Apr. 2005.

Zeleznik et al. "Two Pointer Input for 3D Interaction", ACM, 1997, pp. 115-120.

* cited by examiner

Authoring Process

Navigation Process

FIGURE 23
340
342
   
344   346

120
SYSTEM AND METHOD OF INTEGRATED SPATIAL AND TEMPORAL NAVIGATION

CROSS-REFERENCE TO RELATED APPLICATION

This application is related to a U.S application entitled "A PUSH-TUMBLE THREE DIMENSIONAL NAVIGATION SYSTEM" having Ser. No. 10/183,432, by Azam Khan, filed Jun. 28, 2002 and incorporated by reference herein.

BACKGROUND OF THE INVENTION

1. Field of the Invention

The present invention is directed to a method and system for authoring and navigating stylized three-dimensional imagery using integrated or seamless spatial and temporal control.

2. Description of the Related Art

In the field of computer graphics, 3D models can be created and realistically rendered in real time on commodity hardware. As such, it is feasible to use 3D models rather than 2D images to represent or showcase various scenes and physical artifacts. For example, many product manufacturers' websites are beginning to publish or advertise their products in 3D format, as well as in the more traditional 2D image format. Typically, a viewer can navigate a 3D format model of the product. A drawback of 3D navigation has been that the visual and interactive experience provided by conventional 3D viewers lacks the professionally authored quality of traditional 2D graphics and images, such as those found in television advertising.

For example, the professionally authored 2D images in an automobile sales brochure typically present the viewer with a rich and compelling presentation of the automobile that may emphasize attractive features and aesthetics of the automobile, such as a nostalgic tailfin or a racer-like profile. On the other hand, an unconstrained free-form interactive 3D exploration of a model of the same automobile, as typically provided on the manufacturer's website, will not emphasize or even assure viewing of these qualities. Instead, when navigating a model of the automobile using free-form zoom, rotate, and translate commands, the viewer might not view the model from the vantage points that the 2D images emphasized, and thus may overlook the tailfin and racer-like profile. The viewer may instead end up viewing the ordinary undercarriage of the automobile, or the automobile model may be unrecoverably navigated out of view. If 3D viewings are to replace or compete with the 2D viewings, this gap in visual and interaction quality needs to be reduced.

There are roughly two reasons for the poor quality of conventional 3D viewers. First, 2D imagery is typically produced by professional advertisers, graphic artists, and photographers who are skilled at using this well-established art form to convey specific messages to a viewer, such as information, feelings, or experiences. In contrast, creators of 3D models may not have the same well-established skills and are working in a new and evolving medium. Second, in creating 2D images a photographer can carefully control most of the elements that make up the image including lighting and viewpoint. These elements become a fixed part of the 2D image, thus ensuring that the viewer receives the intended message.

In contrast, typical interactive 3D viewers allow the user to move their viewpoint (virtual camera) in the scene to view any part of the 3D model from any angle. As a result, a user may: get "lost" in the scene; view the model from awkward angles that present it in a poor light; overlook important features; experience frustration at controlling their navigation, etc. Because the author of the 3D model has not been able to control how the user eventually sees the model, the author cannot ensure that a person viewing the 3D model receives the author's intended message. The person using the 3D viewer may in fact receive a message opposite to that intended by the author. The racer-like automobile may be incorrectly perceived as no different than the previous year's model.

What is needed is a method and system that enables an author to control how their 3D subject will be viewed, thus ensuring the author that the viewer receives the author's intended message.

SUMMARY OF THE INVENTION

It is an aspect of the present invention to integrate spatial and temporal control into a single user interaction model with no explicit mode switching.

It is an aspect of the present invention to provide a system for authoring 3D navigation experiences.

It is another aspect of the present invention to enable authors to stylize the way in which their 3D models are viewed and to convey an intended message about the model to the viewer.

It is still another aspect of the present invention to eliminate the "lost camera" problem that occurs with conventional free-form 3D navigation.

It is also an aspect of the present invention to provide for 3D navigation using multiple camera surfaces.

It is another aspect of the present invention to navigate a model by using the same navigation technique to both spatially control viewing of the model from camera surfaces and to temporally control the display of images when transitioning from one camera surface to another.

It is a further aspect of the present invention to use a single start-drag-release interaction or mouse movement to integrate spatial and temporal navigation of a 3D scene or model.

It is an aspect of the present invention to control the pacing of 3D navigation by changing the gain of camera translation on a camera surface according to the location of the camera on the camera surface.

It is yet another aspect of the present invention to temporally control the display of an interpolated camera transition between camera surfaces in the same way that the camera is spatially moved when on the camera surfaces.

It is a further aspect of the present invention that while the user experience may be perceptually 3D, it may actually be generated using 2D images, possibly pre-rendered.

The above aspects can be attained by a system that displays or renders a subject or scene according to a current viewpoint on an original camera surface that is facing the subject or scene and that is spatially separated from a destination viewing surface that is also facing the subject or scene. The system collects a continuous stream of two-dimensional input data. According to a first portion of the two-dimensional input data, the system translates the current viewpoint on the original view surface. After the translating and according to a later portion of the continuous stream of two-dimensional input data, the system allows for interactive temporal control of the display of a transition effect as the current view or viewpoint transitions from the original camera surface to a destination camera surface.

These together with other aspects and advantages which will be subsequently apparent, reside in the details of construction and operation as more fully hereinafter described

BRIEF DESCRIPTION OF THE DRAWINGS

FIG. 23 shows hardware of the present invention.

DETAILED DESCRIPTION OF THE PREFERRED EMBODIMENTS

Introduction

Figure 1:
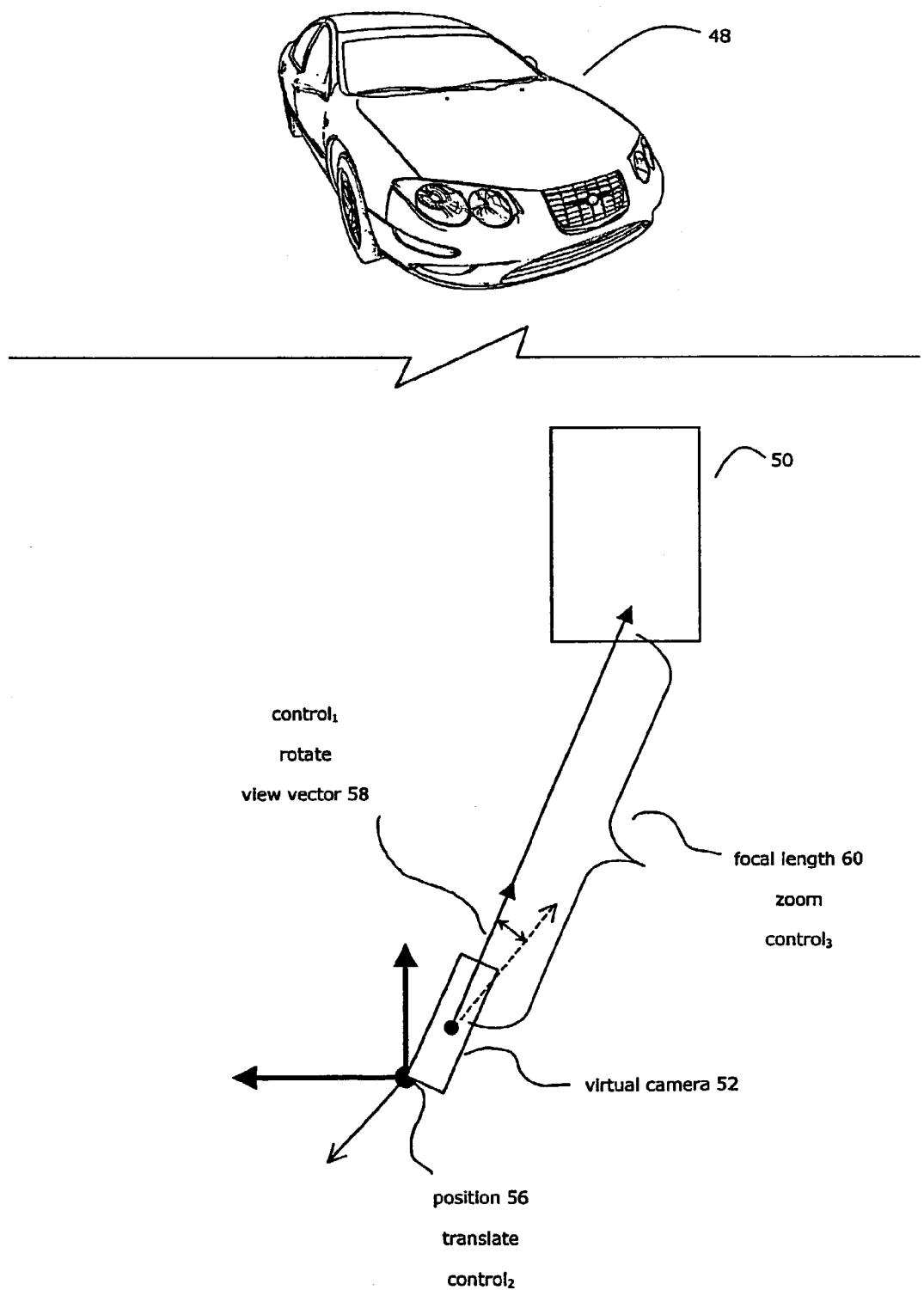
FIG. 1 shows a rendering 48 of a model 50 being conventionally navigated or viewed with a virtual camera 52.

FIG. 1 shows a rendering 48 of a model 50 being conventionally navigated or viewed with a virtual camera 52. The 3D subject model 50, in this case a model of an automobile, is rendered and displayed according to the state of the virtual camera 52 to produce image 48. The state of the camera typically includes a position 56, a view direction or vector 58, and a focal length 60. Conventionally, the rendered display 48 of model 50 is changed by manipulating the camera's 52 settings 56, 58, 60. Generally, three or more different controls are used to change the camera's 52 settings 56, 58, 60. For example Control1 (e.g. button1+mouse) will cause the camera to rotate or tumble by changing the view vector 58. Control2 (e.g. button2+mouse) will cause the camera 52 to pan or translate by changing the position 56. Control3 (e.g. button3+mouse) will cause the camera 52 to zoom by changing the focal length 60. This type of free-form 3D navigation typically used on the World Wide Web (WWW) lacks authoring constructs that would enable an author to stylize a navigational experience. Control of the camera 52 or viewpoint is left up to the user and the author has limited influence on the overall experience.

A concept central to the present invention is the idea of differentiating between authoring an interactive 3D experience versus authoring a 3D model that a user subsequently views or navigates in free-style fashion using general controls. With a typical 3D viewer on the WWW, in terms of interaction, the original author of the 3D scene is limited to providing somewhat standard interactive camera controls such as pan, tumble and zoom. From an author's perspective this is a significant imbalance. If the quality of an interactive experience is considered by cinematic standards, an author (or director) of a movie has control over several major elements: content or artistic direction, shading, lighting, and in particular, viewpoint and pacing. These elements typically comprise the visual style of a movie. However, with the interactive experience provided by current free-form 3D viewers, the author surrenders control of two major elements of visual style (viewpoint and free-form pacing), and places control of the viewpoint completely in the hands of the user. Other forms of navigation may be based on one axis. Many degrees of navigation are possible with the present form of navigation. Furthermore, dynamic viewpoint-aware lighting, insets (picture-in-picture effects), and film style editing are also possible.

With the present invention, authors create frameworks for 3D interactive experiences where the author not only determines the content and shading, but also determines the viewpoints and pacing. However, intrinsic in any interactive system is some degree of user control. Thus the present invention provides constructs with which the author can significantly influence the viewpoints and pacing to create particular visual styles, thereby striking a balance between author control and user control. To achieve this balance, the present invention incorporates an interaction technique or model that seamlessly integrates spatial camera control with temporal control of camera animation or the display or playback of a linear sequence of images.

Conceptual Overview

To enable an author to control or influence viewpoints and pacing, several elements are provided to build a navigation framework. Three main elements are: camera surfaces, over which a user has some control of 3D spatial navigation; animation clips or surface transitions, over which a user has some control of temporal display or navigation; and a unified user interface or control technique, such as dragging a mouse, for seamlessly controlling both types of navigation. Each element is discussed later in corresponding sections.

Figure 2:
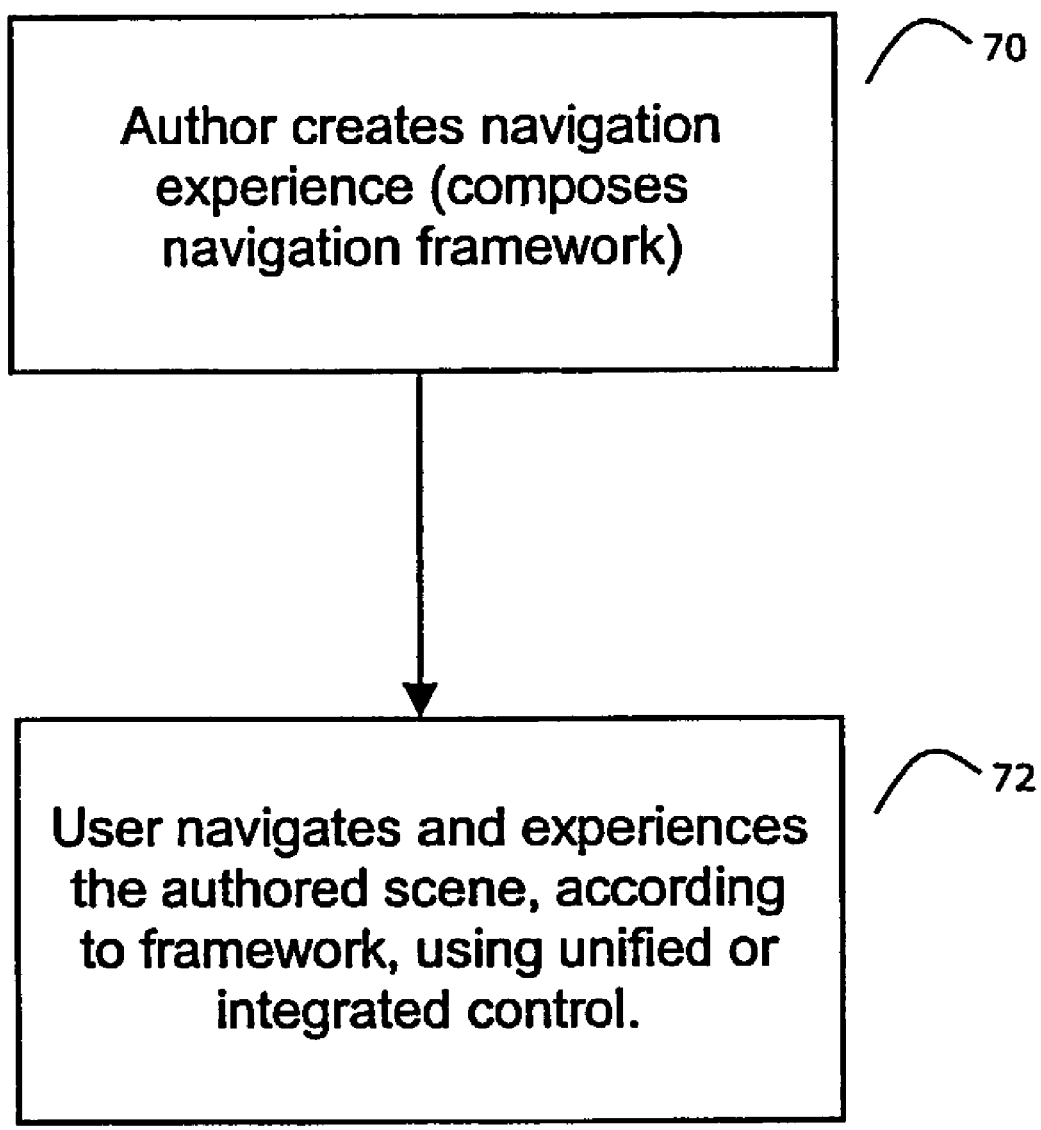
FIG. 2 shows an overview of making and using a stylized navigation framework or experience that avoids the problems of free-form model navigation.
Figure 3:
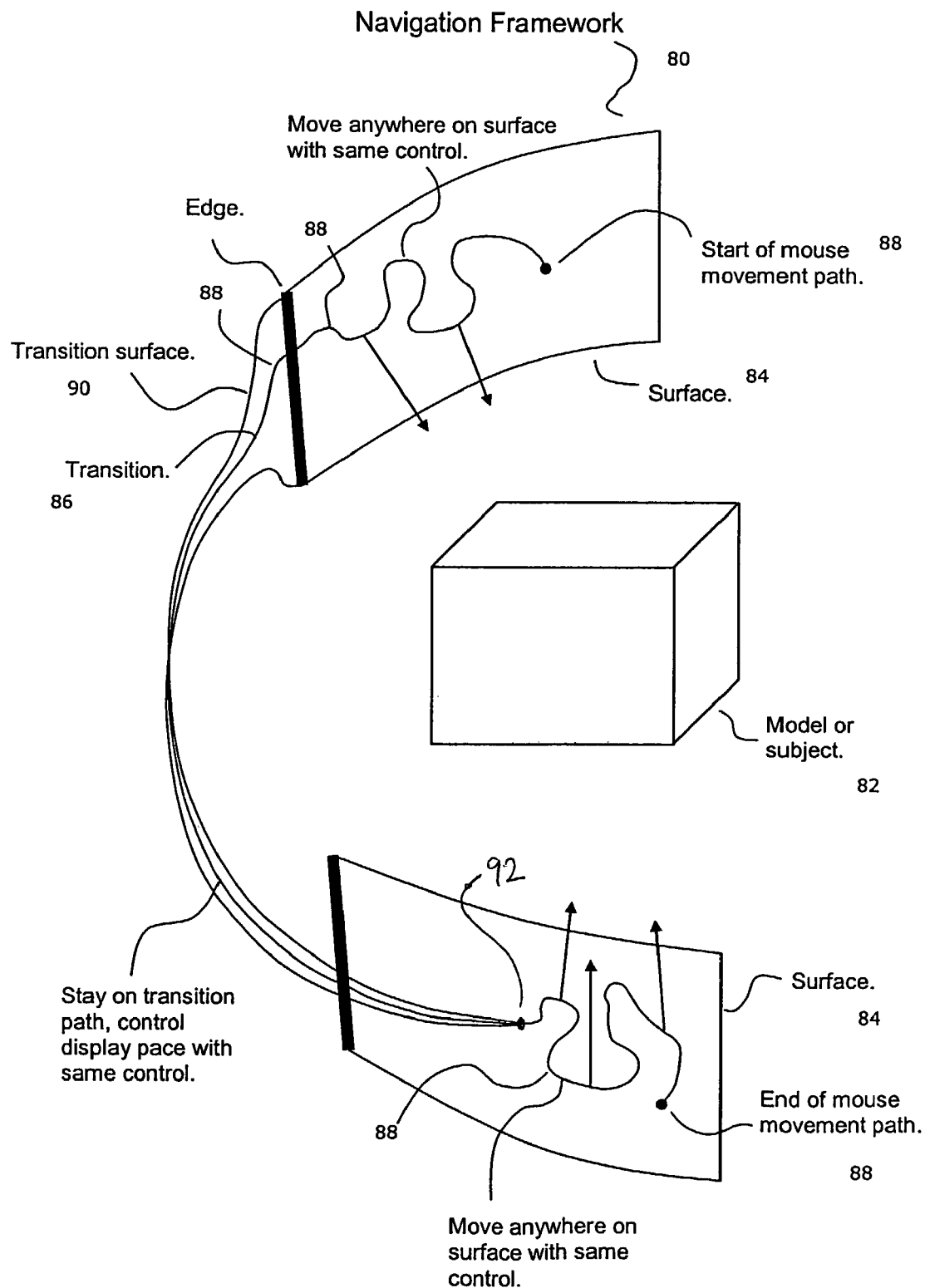
FIG. 3 shows an example of an authored navigation framework 80 arranged around a model 82.

FIG. 2 shows an overview of making and using a stylized navigation framework or experience that avoids the problems of free-form model navigation. FIG. 3 shows an example of an authored navigation framework 80 arranged around a model 82. An author who would like to design a framework with which a viewer can experience a 3D model or scene in a style determined by the author will initially create a navigation framework by composing together 70 the camera surfaces 84 in relation to the model or subject and transitions 86 between camera surfaces (camera surfaces and transitions are discussed in detail later). The framework may be made dynamic with the addition of event-driven or context-sensitive logic.

Viewers will then navigate 72 and experience the model or subject using one control mechanism (e.g. a mouse drag) to both spatially move a virtual camera along the camera surfaces and to control or interact with the transitions that are displayed when transitioning between the camera surfaces, where the transitions are constrained or limited viewing experiences.

Mouse movement path 88 shows a path that a user might navigate by moving or dragging a mouse. In this example, a transition surface 90 guides or constrains the movement path 88 of the camera during temporal or transitional control. Further in this example, the destination surface 84 (lower surface) is entered at a pre-defined transition exit/entry point 92, rather than an edge.

Transitional control may also be referred to as temporal control, as opposed to free-form camera control or spatial control on a camera surface. An authored framework may also be referred to as an orchestrated or stylized virtual camera; a "StyleCam".

Users viewing 3D scenes or models with a StyleCam can be guaranteed a certain level of interactive viewing quality. Furthermore, a StyleCam viewing or navigation experience will not only avoid the problems discussed in the Background, but will also adhere to particular visual styles that the author intends to convey to the viewer. For example, with a StyleCam an author can produce an interactive viewing experience for a 3D model of an automobile "in the style of" a television commercial or a magazine advertisement for that same automobile. In a carefully designed StyleCam navigation framework, an author can stylize every displayable frame or image.

To enable an author to control or influence viewpoints and pacing, several elements are provided. Three main elements are Camera surfaces, Animation clips or surface transitions, and a unified user interface (UI) or control technique. Camera surfaces are author-created surfaces that are used to constrain a user's movement of the navigational viewpoint (or virtual camera). Animation clips or transition effects are author-created sets of visual sequences and effects whose playback and display may be temporally controlled by the user. That is to say, their pacing, timing, or rate and chronological direction of display may be controlled by the user. Examples of animation transitions can include: sophisticated camera movements; 2D slates such as images, movies, documents, or web pages; visual effects such as fades, wipes, and edits; and animation of elements in the scene or subject being navigated. A unified UI or control technique enables a person navigating the scene or model to use a single method of interaction (e.g. dragging) to control the viewpoint on the camera surfaces and to control the display of transitions between camera surfaces.

Authoring

Figure 4:
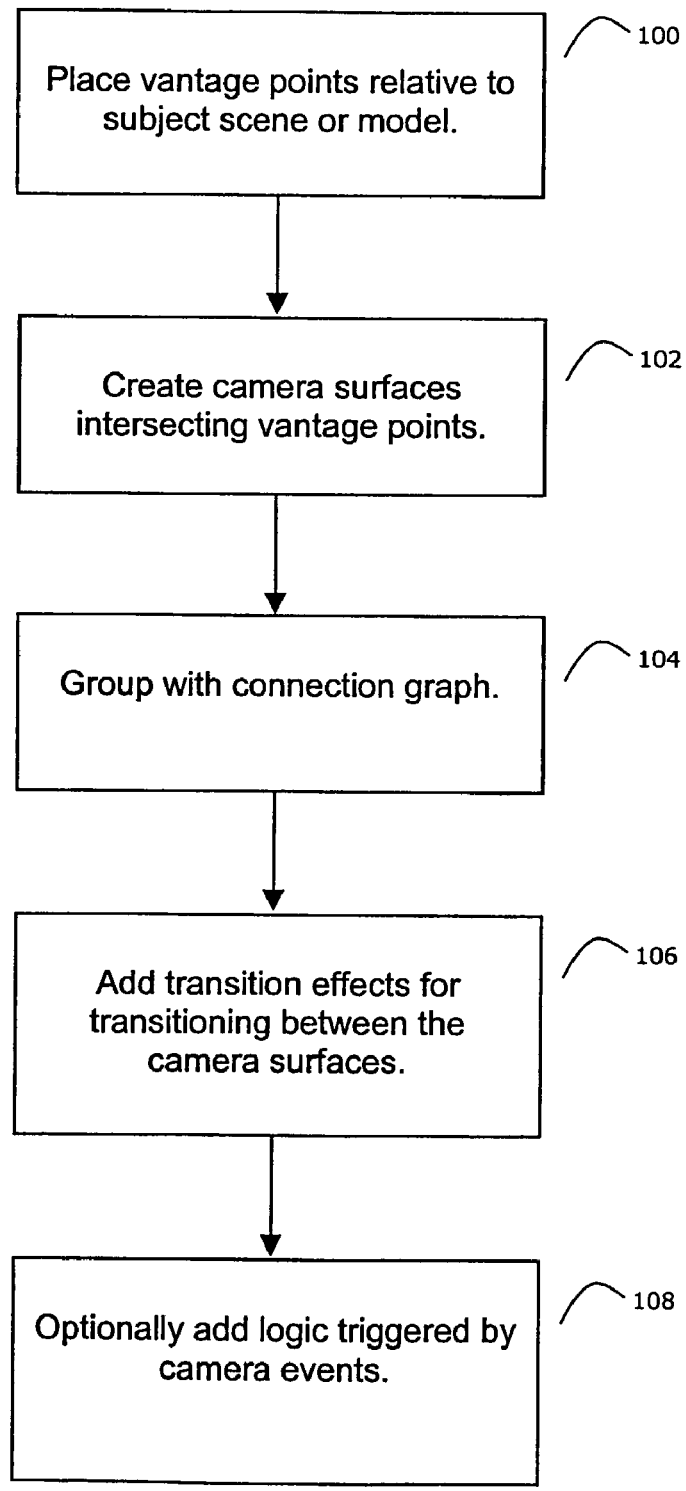
FIG. 4 shows an authoring process for creating a StyleCam navigation framework.

FIG. 4 shows an authoring process for creating a StyleCam navigation framework. One purpose of the framework authoring process is to emulate or imitate in three dimensions a two-dimensional money-shot. A conventional two-dimensional money-shot is an image of a subject taken from a vantage point chosen by the author to emphasize a certain view or specific features of the subject. For example, the image 48 shown in FIG. 1 could be a money-shot of an automobile taken off-center from the front of the automobile with the intent of emphasizing a newly redesigned front end of the automobile. Therefore, the framework authoring process may begin with the creation and placement 100 of money-shot viewpoints (or vantage points) in three dimensions around the model or scene that will be the subject of navigation. The money-shot vantage points are then used to place camera surfaces around the subject by, for each vantage point, creating a camera surface and placing 102 the camera surface in three-dimensions so that it intersects money-shot vantage point. To facilitate implementation of the framework, the final camera surfaces may be grouped 104 with a connection graph. Transition visuals or effects are added 106 for transitioning between spatial navigation of one camera surface and spatial navigation of another camera surface. Finally, logic triggered by various navigation events may be added 108, thus imparting a dynamic element to the navigation framework being authored.

The process described above with reference to FIG. 4 is a preferred embodiment and its details are not necessary to practice the invention. For example, the vantage points may be omitted and the camera surfaces may be directly placed relative to the subject. Vantage or money-shot points are not necessary, but may help an author who is accustomed to using conventional 2D money-shots to become accustomed to using vantage areas or extended money-shots (camera surfaces). Money-shots may also be generated and automatically placed on surfaces. Primarily, money-shots serve as destination points for transitions. Furthermore, dynamic navigation logic is not necessary. What is generally important is the creation of a framework or set of information that, when navigated or interacted with conveys to the viewer or navigator the author's intended message about the subject.

Figure 5:
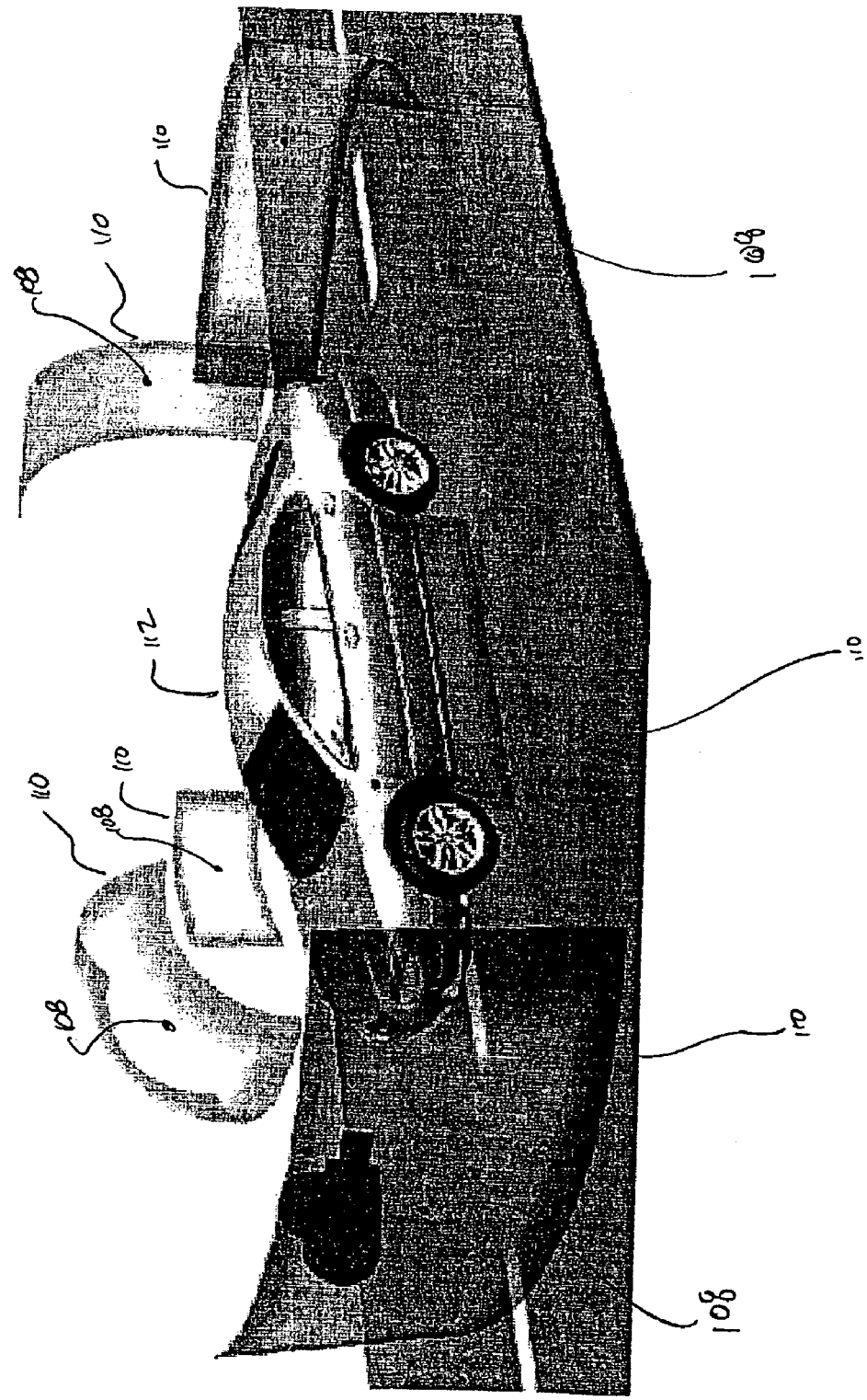
FIG. 5 shows an example of 6 vantage points 108, through which camera surfaces 110 have been placed 102 relative to a subject model 112.
Figure 6:
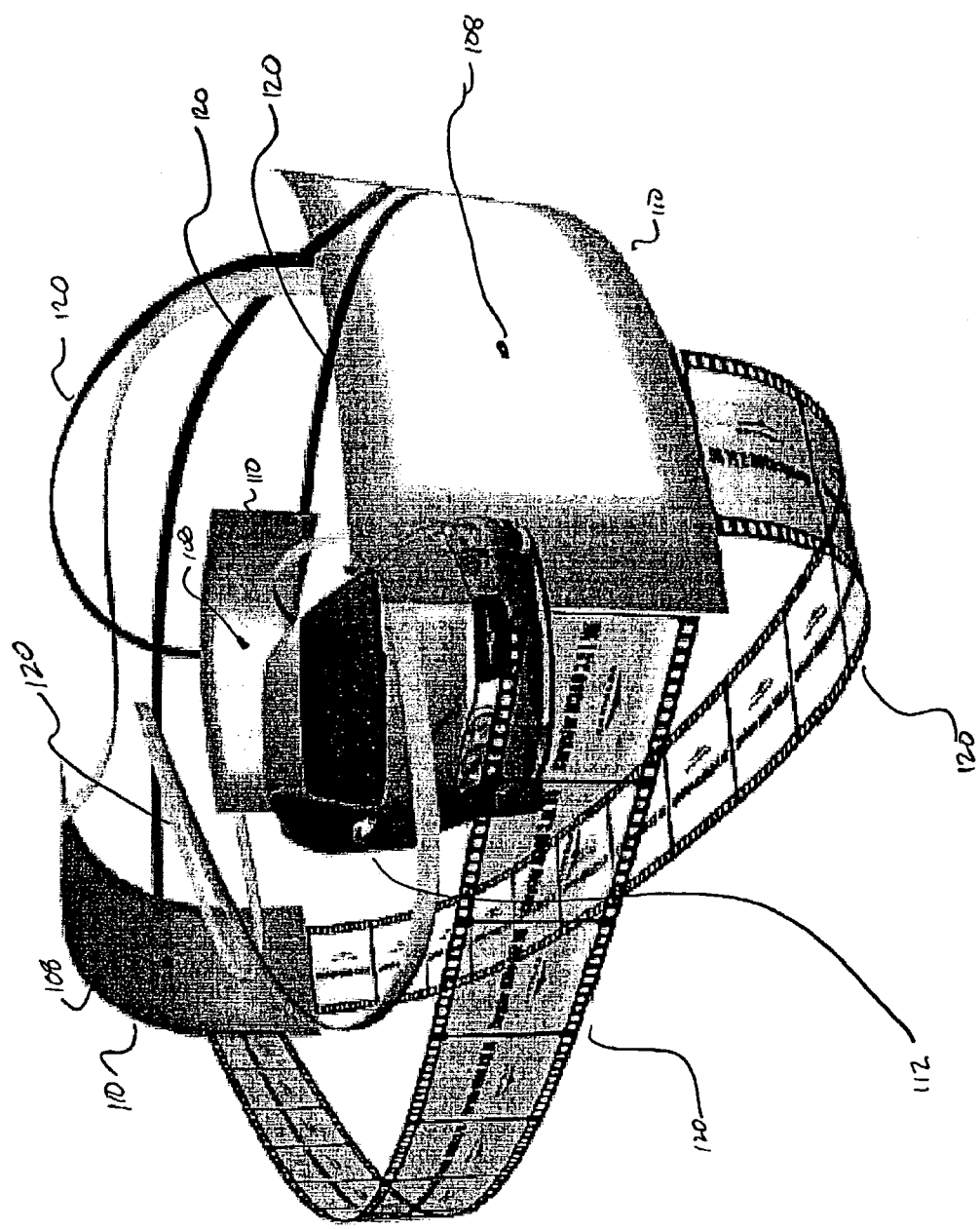
FIG. 6 shows another view of subject 112 where surface transitions 120 have been added 106 to the navigation framework.

FIG. 5 shows an example of 6 vantage points 108, through which camera surfaces 110 have been placed 102 relative to a subject model 112. FIG. 6 shows another view of subject 112 where surface transitions 120 have been added 106 to the navigation framework.

Navigating

Figure 7:
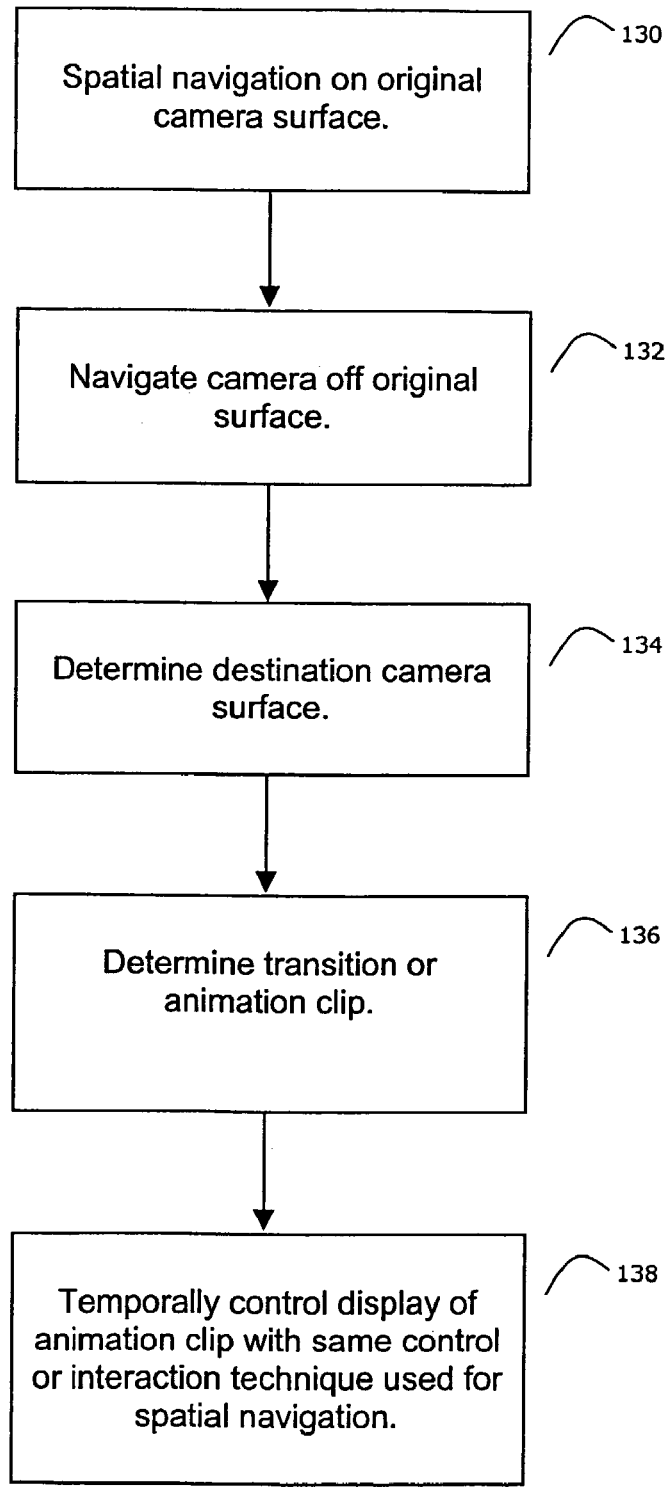
FIG. 7 shows a process of navigating a framework.

FIG. 7 shows a process of navigating a framework. Initially, a user spatially navigates 130 on an original camera surface. When the user navigates 132 off the original surface, the system determines 134 a destination camera surface. The system then identifies or determines 136 a transition animation clip or transition effect that connects the original surface and the destination surface, and the user begins temporally controlling 138 display of the identified animation or effect, using without interrupting the same control or interaction technique, used for spatial navigation.

Figure 8:
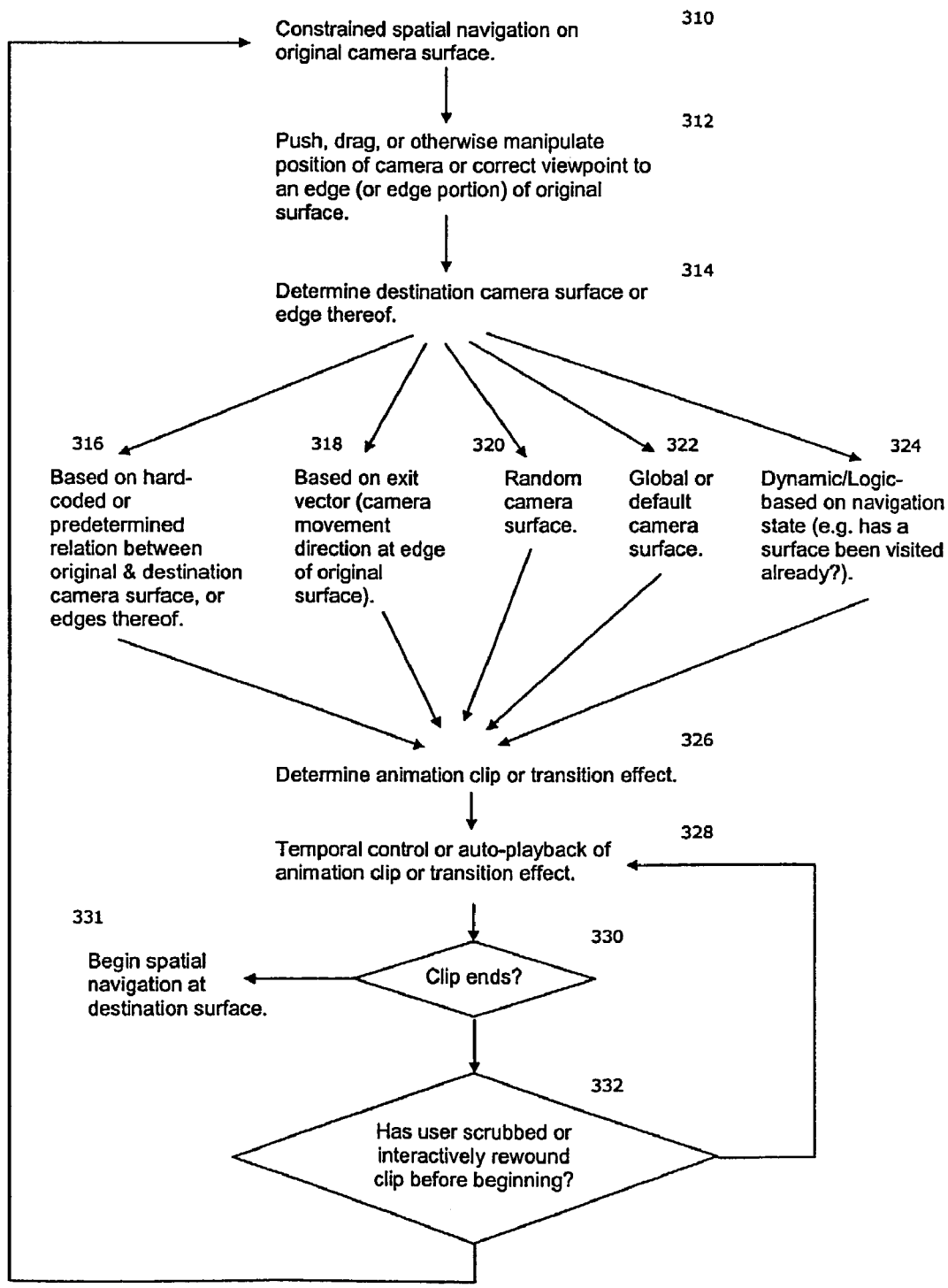
FIG. 8 shows another process of navigating a framework.

FIG. 8 shows another process of navigating a framework. A user performs spatial navigation 310 constrained on an original camera surface. The user pushes, drags, or otherwise manipulates 312 the position of the camera or current viewpoint to an edge (or edge portion) of the original surface. In response, a destination camera surface or edge thereof is automatically selected, ascertained, or determined 314. Depending on the author's design, the destination camera surface can be determined 314 (a) based 316 on a hard-coded or pre-determined relation between original and destination camera surfaces, (b) based 318 on an exit vector (camera movement direction at the edge of the original surface), (c) based 320 on on-the-fly random selection, (d) based on a global default, or (e) based 322 on the current (dynamic) navigation state. The navigation state reflects the history of the user's navigation. Other bases may be used, and the manner of determination 314 is not critical to implementation of the invention. As an example of a dynamic based 322 determination 314, the navigation state may indicate that 1 of 2 possible destination surfaces has already been visited, and therefore the unvisited surface is determined 314.

Rather than surface edges, predefined transition entry or exit points, not necessarily limited to a surface edge, may also serve as the boundary between surface navigation and transition control (see FIG. 3, point 92).

After determining 314 a destination surface, an animation clip or transition effect is prepared or determined 326. Transitions/animations are discussed in detail in a later section. The transition or animation effect is then displayed, and temporal, chronological, or pacing control/navigation control 328 (e.g. scrubbing) begins. It is also possible to have fully automatic playback that is not controlled by the user. If the clip ends 330, then spatial navigation 331 begins on the destination surface. If by the interactive temporal control 328 the user has rewound (reverse-scrubbed) 332 the clip at or before its beginning (i.e. has returned the view to the edge or exit point of the original surface), then the former surface becomes the current or original camera surface and constrained spatial navigation 310 resumes.

It is also possible to use one camera surface with transitions going from one edge or exit/entry point of the camera surface to another, or from one edge or point and back to the same edge or point, in which case the original and destination surfaces are the same.

Camera Surfaces

In the motion picture industry a money-shot is a shot with a particular viewpoint that a director has deemed "important" in portraying a story or in setting the visual style of a movie. Similarly, in advertising, money-shots are those shots or images deemed to effectively convey the artist's intended message to the viewer. The present invention uses camera surfaces to extend the concept of a money-shot. The money-shots, camera surfaces, viewing surfaces, etc. of the present invention are sets or loci of viewpoints that an author can use to broadly determine what a user will see. Although depicted in a number of the figures as generally rectangular shaped surfaces, camera surfaces are not limited to such form, and may be any set of spatially grouped points in three-dimensional space, selectable with two-dimensional input, and giving the appearance of seamless spatial navigation of the subject. In the case of camera surfaces that are volumes (discussed below), then a third dimension of input control could be used (e.g. a mouse wheel).

Figure 9:
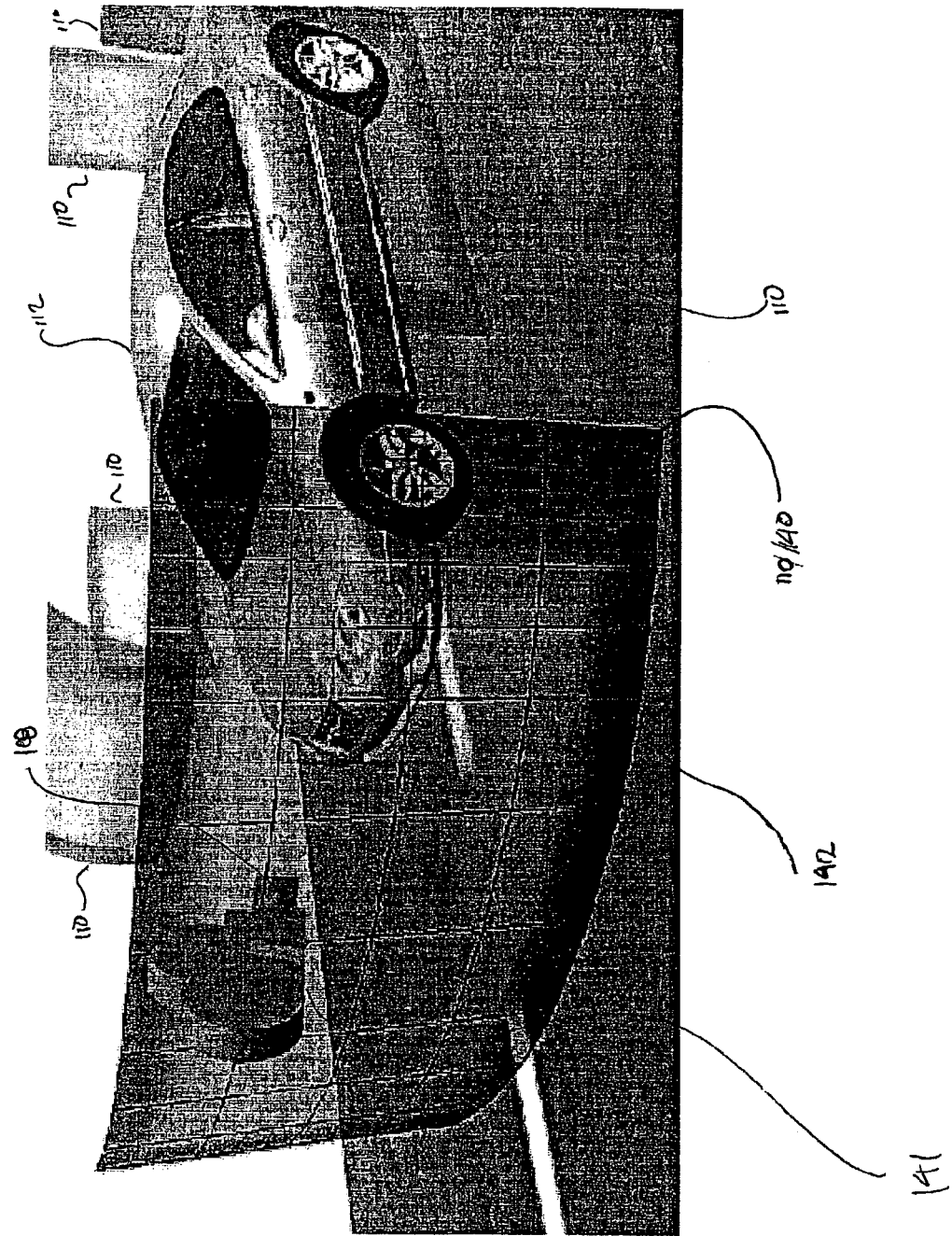
FIG. 9 shows an example of a camera surface 110/140.

FIG. 9 shows an example of a camera surface 110/140. The active viewpoint or camera 141 is at the money-shot viewpoint 108 on first camera surface 140. When on a camera surface, the virtual camera's spatial movement is constrained to that surface, and preferably automatically and persistently points normal to the surface, towards a look-at point (or normal to the subject being viewed or navigated). As mentioned above, each camera surface 110 is preferably defined such that they incorporate a single money-shot viewpoint 108. A camera surface that is small relative to the subject can be thought of as an extended or enhanced money-shot where the user is allowed to move their viewpoint a bit in order to get a sense of the three-dimensionality of the subject 112 being navigated. Alternatively, the shape and placement of a camera surface can be used to provide dramatic camera movements, for example, sweeping across the front grill of a car (see element 142 in FIG. 9).

Camera surfaces allow authors to conceptualize, visualize, and express particular ranges of viewpoints they deem important. Multiple camera surfaces can be used to capture multiple money-shots, thus further enabling authored interactions with the subject. Authors can broadly influence a user's viewpoint by adding multiple camera surfaces. Authors can locally influence the user's viewpoint by adjusting the shape of a camera surface to allow a user to navigate through a range of viewpoints which may be similar to a single particular money-shot. For example, as shown in FIG. 6, camera surfaces 110 at the front and rear of the car subject 112 provide two authored viewpoints or ranges of viewpoints of these parts of the car 112 within which a user can "move around a bit" to get a better sense of the shape of the front grille and rear tail design.

The rate at which a user moves around on a camera surface is called the control-display gain. The control-display gain can dramatically affect the style of a navigation experience. To give an author some control over visual pacing, the author can set the rate at which dragging the mouse changes the camera position as it moves across a camera surface. Increasing the control-display gain ratio causes the camera to move slower with the same control rate. Decreasing the control-display gain ratio causes the camera to move faster with the same control rate. The control-display gain ratio can be set by the author to influence how fast a user moves in the scene, which contributes to a sense of pacing and visual style. For example, if small mouse movements cause large changes in viewpoint this may produce a feeling of fast action while large mouse movement and slow changes in movement produce a slow, flowing quality. Areas of low control-display gain ratio can also be used emphasize viewing from the area because a slower moving camera will cause a viewer to spend more time in such an area. Although useful for authorial control of camera pacing on a camera surface, control-display gain customization is not a required feature of the present invention.

FIG. 9 also shows a grid 142 that illustrates an example of variable control-display gain surface. Grid 142 illustrates that the control-display gain has been set by the author to change according to or based on the position of the camera on the camera surface 140. The control-display gain increases as the camera 141 gets closer to the right edge of the camera surface 140. Any mapping between camera surface location and control-display gain may be used to control pacing of movement of the camera 141 on the camera surface 140. For example, a separate parameter surface, associated with a camera surface, can be used to continuously vary the gain. Surface distance from a money-shot point is another example of C:D gain ratio mapping.

Money-shots, if used, are preferably created by defining a camera or view with a specific position, orientation, and possibly other camera parameters. To include an optional camera look-at point, the author simply defines a point in 3D space, or it may be dynamic, or procedural, such as a tracking point on the surface of the subject.

Camera surfaces may be implemented in various ways. Preferably, the set of viewpoints that comprise a camera surface are mathematically defined by a Non-Uniform Rational B-Spline surface (NURBS). A NURBS surface is a representation of a polynomial surface that is defined by a network of control points. A camera surface may also be defined by a polygon mesh or matrix or web of contiguous inter-navigable points. Iso-surfaces, surface wraps, and other surfaces may also be used. If an extra dimension of camera control is used (e.g. a zoom control), then camera volumes may be used in place of camera surfaces. There is no limit to how a camera surface may be defined or authored, as long as it provides an area of constraint within which the camera may be interactively moved, manipulated, or arranged with preferably two-dimensional input.

An advantage of camera surfaces is that the user need only translate or move the camera; the camera direction/orientation and focus are automatically controlled or maintained, thus reducing the complexity of controls necessary for navigation. For example, the orientation of the camera can be automatically set to keep the camera facing a look-at point while the camera is moving on the camera surface. The camera orientation can be automatically set according to parameters associated with locations on the camera surface (e.g. a "view-direction" parameter surface). The orientation can be automatically set to keep the camera normal to the camera surface. The orientation can also be automatically set to keep the camera normal to a surface of the subject. U.S. patent application Ser. No. 10/183,432 provides further explanation of how these techniques may be implemented, particularly using two-dimensional input. The camera on a camera surface can also have a look-at surface to which the view is constrained. A dynamic look-at point dynamically constrained to a surface is one example.

Figure 10:
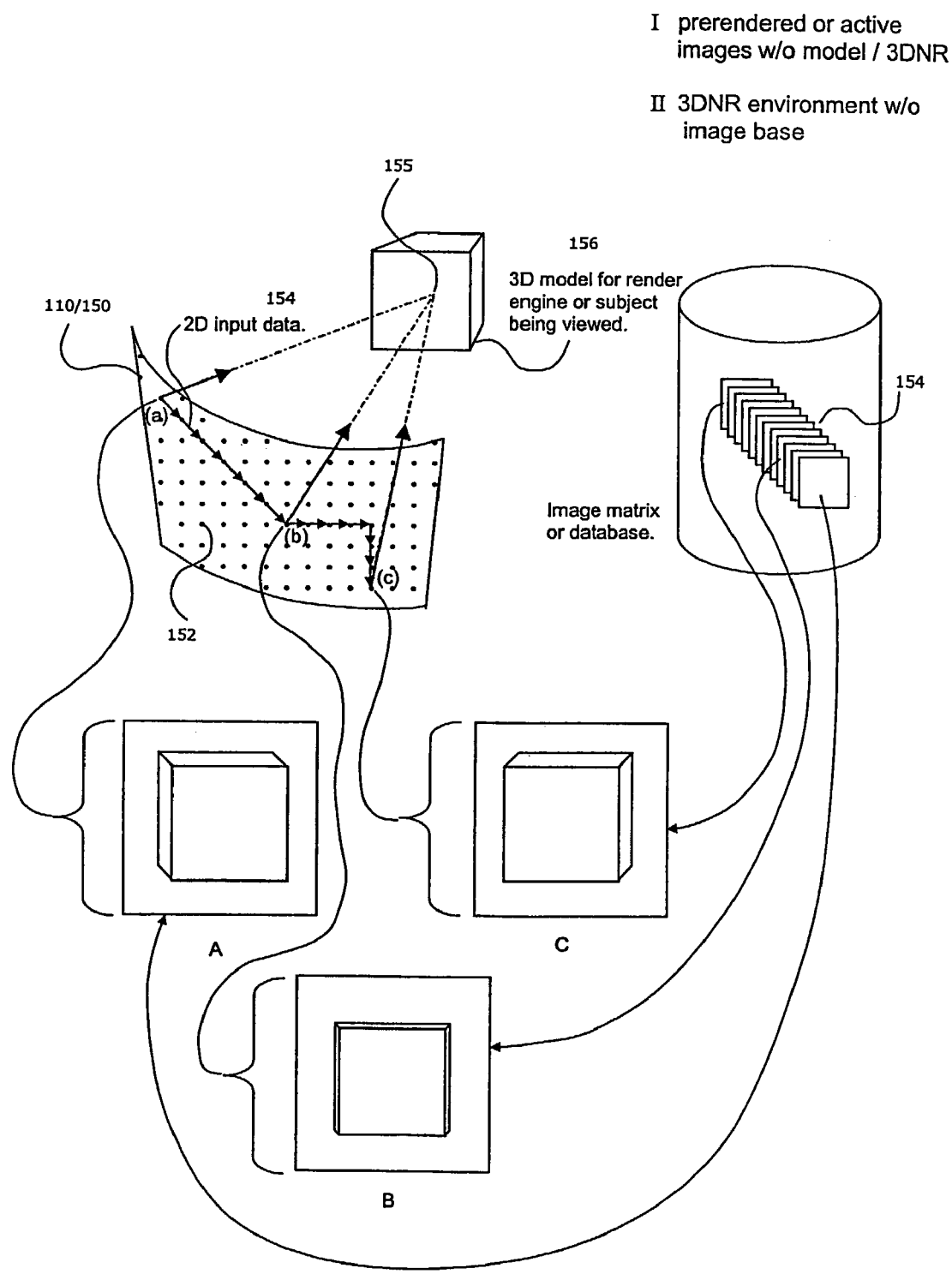
FIG. 10 shows two ways that views from a camera surface may be implemented.

FIG. 10 shows two ways that views from a camera surface may be implemented. Although a mathematically defined camera surface defines an infinite number of points, in practice only a finite number of viewpoints on the surface are required. The granularity of the camera control, the resolution of the display, and other factors may limit the discrete number of navigable viewpoints of the camera surface. In other words, only a finite number of viewpoints are needed to enable the appearance of smooth 3D navigation on a camera surface. As mentioned above, a camera surface may be considered to be a set or locus of points. FIG. 10 shows a surface 110/150 which is a set of points 152. The points 152 may be navigated with two-dimensional input data 154 such as a mouse movement vector stream, where the virtual camera is moved or jumps from one point to another based on the two-dimensional input data 154. The orientation of the camera or viewpoint may be automatically set by any of the techniques mentioned above, for example by using a look-at point 155. Whether a camera surface is defined by a set of points or not, U.S. patent application Ser. No. 10/183,432, provides details on how camera surfaces may be defined and navigated, particularly with two-dimensional input.

The term "camera surface" is defined to include both continuously navigable mathematically defined surfaces, as well as surfaces that comprise a set of discrete viewpoints as described above. "Viewing surface", "viewpoint surface", and "view surface" are alternative terms for a camera surface.

Because the surface 150 in FIG. 10 is defined by the set of points 152, and when the set of points 152 are defined in advance, it is possible to store in advance a view image 154 associated with each point 152. A view image 154 may be any two-dimensional image, and in particular may have been pre-rendered to correspond to the view from a viewpoint on the camera surface, or may be an actual image corresponding to a point of view of the subject 156 being navigated. The current viewpoint for display is set to one of the points 152 based on the input data 154, and the corresponding pre-stored image 154 is then selected or fetched for display based on the new current viewpoint. For example, referring to FIG. 10, if the current viewpoint is initially at point (a), then corresponding image (A) from image database 158 is displayed. As the input data 154 moves the camera or current viewpoint along the surface 150, the current viewpoint changes from one point 152 to the next, and at each such point 152 a corresponding image 159 will be displayed. As the current viewpoint moves to point (b), image (B) will be fetched and displayed. As the current viewpoint moves to point (c), image (C) will be fetched and displayed. Methods of mapping images to viewpoint positions are known in the art and details may be readily obtained elsewhere (see QuickTime VR). This pre-arranged view image technique may also be used with transition animations discussed below. In this way, a photorealistic Style-Cam interaction may be experienced. Furthermore, if each point 152 has a set of time-variant images, an animated subject 156 may be navigated.

In an embodiment implemented with MAYA, surfaces can be constrained views of 3D models created with Maya, where user mouse movements and button presses are monitored by a MAYA plugin. Mouse drags result in the camera moving along the current camera surface. Specifically, for a given mouse displacement (dx, dy) in a mouse move/drag input stream, the new position of the camera on the camera surface (in uv-coordinates local to the camera surface) is given by (u1,v1)=(u0,v0)+c*(dx, dy) where (u0, v0) is the last position of the camera, and c is the gain constant. If either the u or v coordinate of the resulting position is not within the range [0,1], the camera has left the current camera surface. As discussed earlier, during camera movement the view or camera orientation is preferably automatically maintained, in a manner determinable by the author.

Transitions

After creating preferably two or more camera surfaces, an author will add transition clips or effects for transitioning between the camera surfaces, which are usually mutually non-adjacent and therefore not spatially inter-navigable.

As discussed above, navigating a framework is not the same as the free-form or unrestricted navigation of a model that was discussed in the background. Navigation on camera surfaces is spatially constrained to the camera surfaces. Navigation or viewing off or between camera surfaces is temporally controlled or constrained, and is also generally spatially limited.

To support constrained or temporal control of navigation or viewing of transitions between two camera surfaces (or edges thereof), transition or animation clips are used. A transition can be thought of as a visual "path" between two camera surface edges. The path may be a pre-defined linear path, a path constrained to a transition surface, or a hybrid thereof (e.g. a path interpolated on a transition surface). When a user navigates to or off the edge (or transition point) of a camera surface, a destination camera surface is decided upon or identified, and display of an animation clip designated for playing during transitions between the surfaces is triggered. When display of the animation ends, the user resumes navigating or viewing the subject at the destination camera surface. When the animation is rewound (scrubbed backwards) to its beginning, navigation on the original surface resumes.

Figure 11:
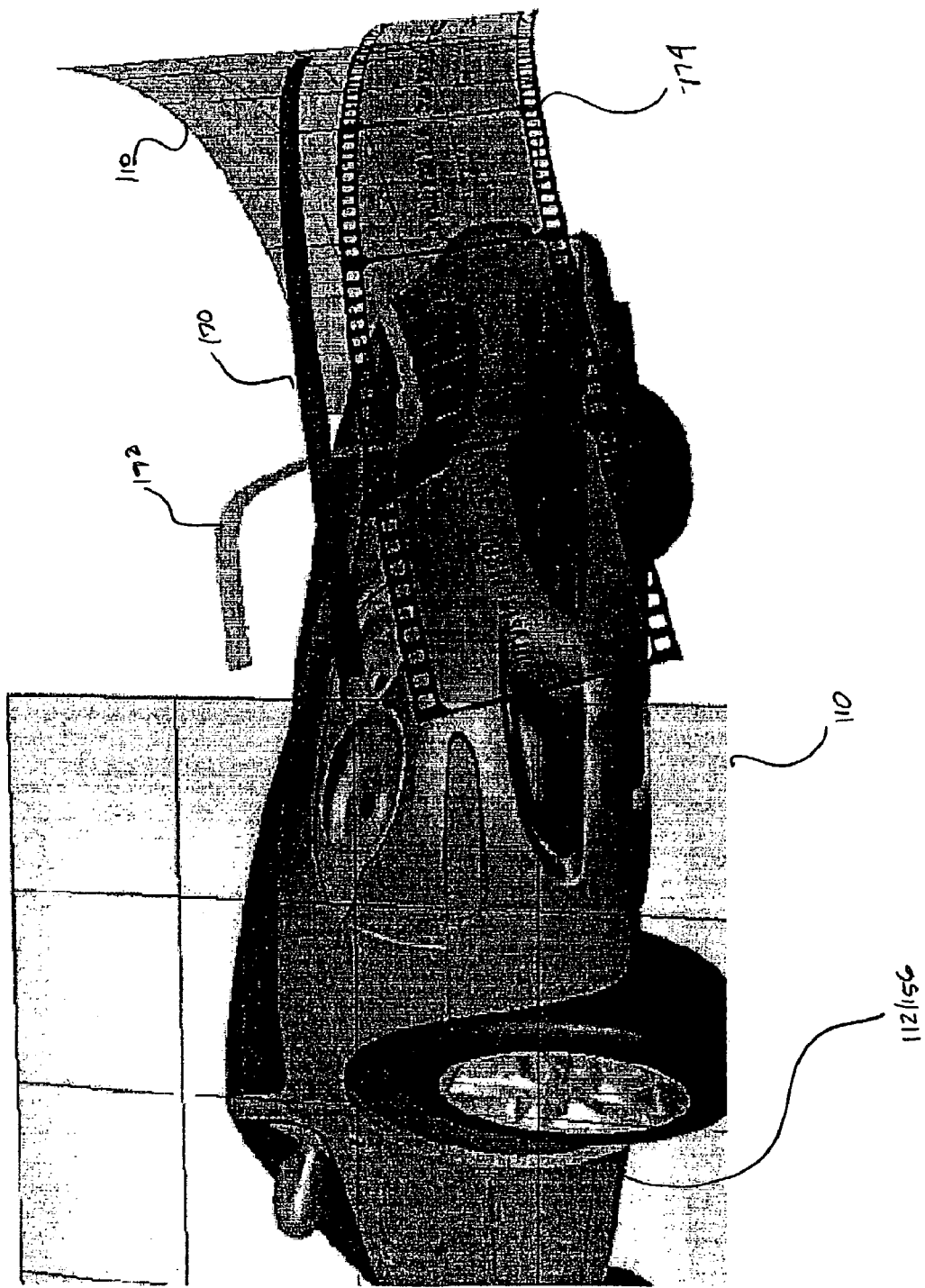
FIG. 11 shows some examples of transitions or animation clips.

FIG. 11 shows some examples of transitions or animation clips. Upon exiting either of camera surfaces 112/156, an automatic transition 170, an authored stylized transition 172, or a slate transition 174 may be invoked.

Automatic Transitions

Automatic transitions smoothly move the camera from one camera surface to another without requiring any authoring of the visual content to be displayed. This is preferably done by having the navigation system perform conventional quaternion interpolation of camera orientation, combined quaternion and linear interpolation of camera position, and linear interpolation of other camera properties such as focal length. Explanations of linear and quaternion interpolation are available elsewhere. An author may control the pacing or destination surface of an automatic transition.

Figure 12:
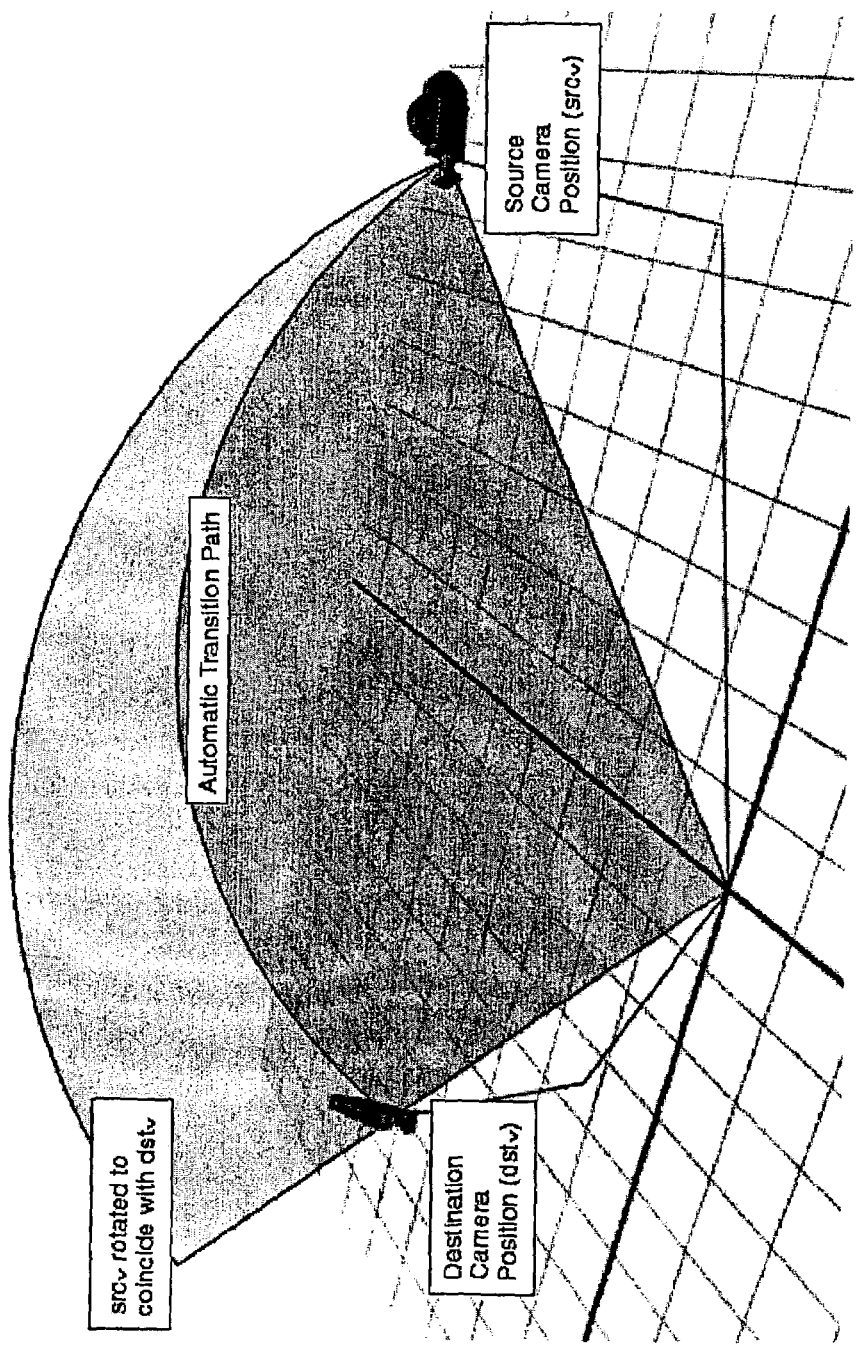
FIG. 12 shows an interpolation path used with an automatic transition 170.

FIG. 12 shows an interpolation path used with an automatic transition 170. The interpolation is based on source vector $src_v$ (the position of the camera as it exits one surface) and is also based on destination vector $dst_v$ (the position the virtual camera will have when it renders the next surface). The Automatic Transition Path reflects the path of the camera during transition.

Using quaternion interpolation ensures smooth changes in orientation while defining a smooth arcing path for the position. At each time step in the transition, two quaternions representing the required fractional rotations of the position and orientation vectors of the camera are calculated and applied to the source vectors. In addition, the magnitude of the position vector is adjusted by linear interpolation between the source and destination position vector magnitudes. The result is a series of intermediate camera positions and orientations as shown in FIG. 12.

An automatic transition 170 is preferably implemented by an automatic interpolation of the camera moving from its starting arrangement (position, direction, or both) on the original camera surface to its end arrangement on the destination camera surface. Preferably, quaternion interpolation with linear interpolation correction is used. Automatic interpolated animations are known in the art, and may be found, for example, in Virtual Reality Modeling Language (VRML) systems. When the automatic clip 170 is being displayed, the user may control the pacing of the display of the clip, but generally may not directly reorient or move the camera off the path of the transition 170. Thus, the navigation between the camera surfaces may be considered to be non-spatial, sub-spatial, one-dimensional (forward and backward), or temporal. The sequence of images displayed in correspondence with the automatic clip 170 may be on-the-fly renderings of the view of the subject from a camera on the interpolated animation path and view direction. Alternatively, as discussed above with reference to FIG. 10, pre-rendered images or other images such as stored photographs or image clips corresponding to the steps or frames of the automatic transition may also be used.

Other automatic transitions or methods of interpolation may also be used. The viewpoint or camera can be automatically moved along the interpolation path while the user controls the direction, perhaps constrained, of the camera as it automatically transitions. Preferably, though, the converse is used; as the camera moves along the interpolation path, camera direction is automatically set by interpolation rather than being controlled by the user, and the pacing of the camera's movement along the interpolation path is temporally controlled (scrubbed) by the user.

Authored Transitions

Authored or stylized animations may also be used for transitions. Authored transitions involve the playback of pre-authored or predetermined animation clips. Authored transitions are generally navigated in the same way automatic transitions are navigated, but the camera path and perhaps orientation are determined by the author. This gives the author complete control over the user experience during the transition including the pacing, framing and visual effects.

An exemplary authored transition 172 is shown FIG. 11. Authored transitions and automatic transitions function similarly, however, rather than being automatically determined, authored transitions are camera paths (or corresponding predetermined image sequences) determined by the author, usually to create a particular effect or to convey a specific message. Authored animations can comprise any visual sequence and pacing, and are therefore opportunities for the author to introduce visual style. For example, for transitioning between camera surfaces 110 on sides of the subject car 112 (FIG. 9), the author may create a stylized camera animation like transition 172 which pans across the front of the car subject 112 while closing in on a styling detail like a front grille emblem on the subject 112.

Slates

The generality of using different types of animation clips gives authors the stylistic freedom of abandoning the free-form camera-movement metaphor for user-controlled transitions between surfaces, and affords an opportunity for expressing other types of visual sequences besides interpolated renderings or views of the subject. Thus, animation clips are effective mechanisms for including slates in a navigation framework. Slates are 2D visuals that are not necessarily part of the 3D scene or subject being navigated. In other words, slates are visuals that may generally be independent of the camera state and enable an author to impart additional visual information.

Figure 13:
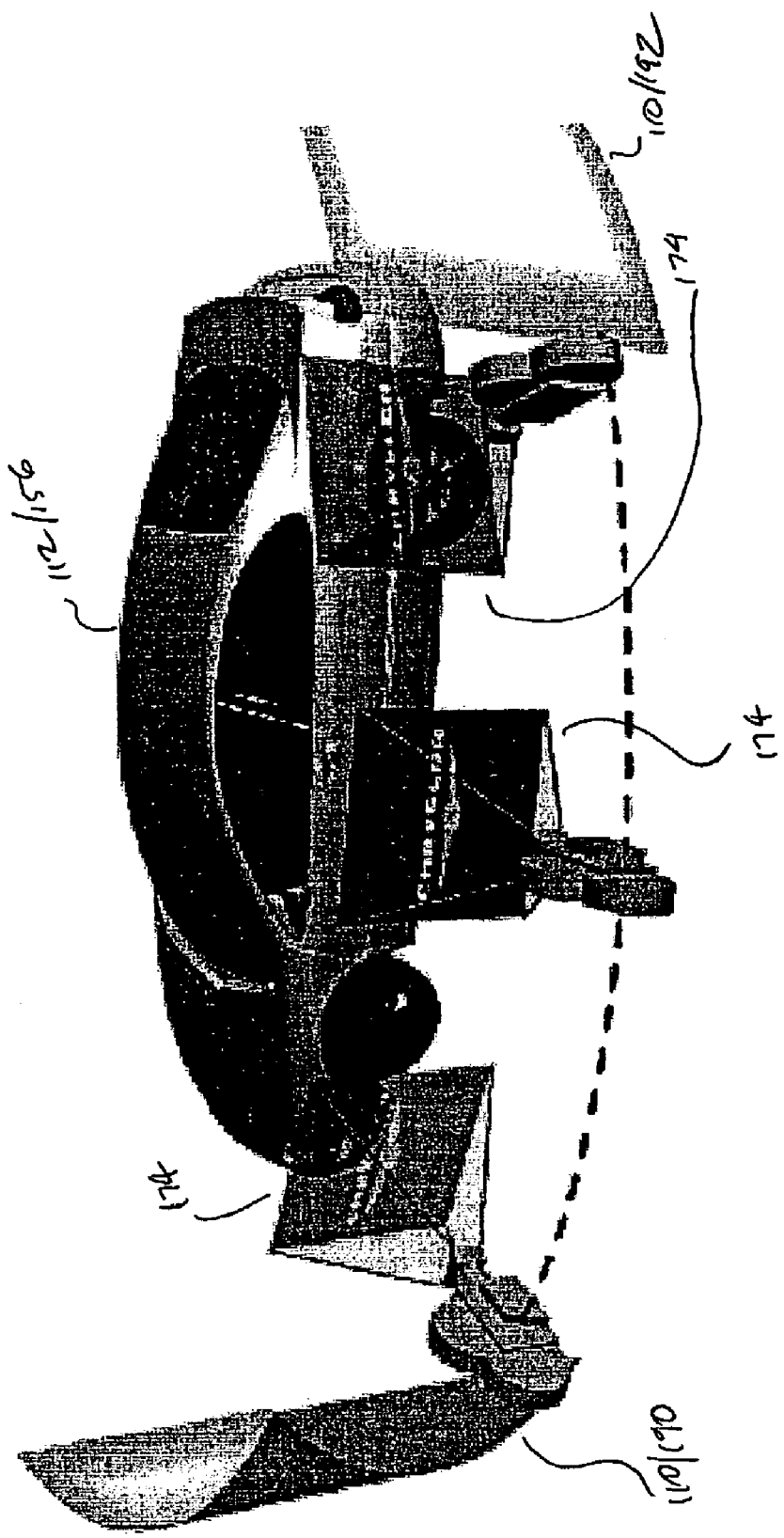
FIG. 13 shows an example of a slate transition.

FIG. 13 shows an example of a slate transition. A slate is momentarily placed in front of the viewing camera 141 as it moves from one camera surface 110 to another. For example, moving or transitioning from a camera surface 110/190 at the front of the car subject 112/156 to a camera surface 110/192 at the back of the car subject 112 may be accomplished using a 2D image 174 showing the name of the car (e.g. "Chrysler", ™). This mechanism allows the use of visual elements commonly found in advertising such as real action video clips and rich 2D imagery. Slates may also contain elements such as documents or web pages.

Other Effects and Transitions

The use of animation clips also allows for typical visual transition effects, such as cross fades, wipes, etc. In addition to using animation clips for transitions between camera surfaces, the present invention may also include support for the animation of elements in the 3D scene. These scene element animations can occur separately or concurrently with transition animations. For example, while the animation clip for the visual transition may sweep the camera down the side of the car, an auxiliary animation may open the trunk to reveal cargo space. The animation of scene elements can also be used to effect extremely broad changes. For example, entire scene transitions (similar to level changes in video games) may occur when a user hits the edge of particular camera surface. At the author's discretion, temporal control of animation clips can either be under user control or uninterruptible. Designation of transitions may change dynamically as navigation progresses. Overall, in terms of visual expression, these varying types of animation clips allow an author to provide rich visual experiences and therefore significantly influence the pacing and style of a user's interaction.

Control of Navigation and Transitions

The present invention provides for temporal control or "scrubbing" of transitions or animations. During spatial navigation mode, the user's mouse drags or moves control the camera's position on the camera surface. However, when the user moves off a camera surface into an animated transition, mouse drags/moves may be thought of as controlling an invisible or hypothetical timeslider of the animation. Time is advanced when the mouse is dragged in the same direction that the camera exited the camera surface and reversed if the directions are also reversed. When the mouse button is released, the system may take over time management and smoothly ramp the time steps towards the animation's original playback rate. Other mouse-to-scrubbing methods may be used. Absolute mouse displacement may drive pacing. Pauses or absence of movement may toggle animation on or off. Movement relative to a particular direction, such as the subject, may also be used. Mouse movement may be translated to temporal control by either controlling what frames are displayed during a continuous rate of frame display, or by directly controlling the rate of frame display.

Unified User Interaction

While animation clips or transitions are effective for navigating a transition between camera surfaces and for introducing visual style, they also highlight the fundamental issue of how an author arbitrates between user control and system control.

The present invention distinguishes between two distinct types of control: 1) user control of the viewpoint or the location of the virtual camera, and 2) control of playback of animation clips or other transition effects. These two types of control behavior have previously been treated as distinct user interactions. Specifically, the user would stop dragging or moving the camera viewpoint and then click on something in the interface to trigger an animation. Stopping the dragging divides the user's attention and interrupts the visual flow of information to the user.

The present invention uses animations or transition effects as a seamless way of facilitating movement between camera surfaces. This is accomplished by providing a mechanism for engaging these animations that does not require an explicit mouse click or change in the current interaction technique to trigger animation. This approach gives the user the impression that they can continuously "drag" from one camera surface to another even though the transition between the surfaces was implemented as an authored or automatic transition effect, rather than an interactive spatial camera movement. These two behaviors are fundamentally different in that viewpoint control on a camera surface is spatial navigation and animation control during a transition is temporal navigation.

From a user interaction standpoint, spatial control can be thought of as "dragging the camera" while temporal control can be thought of as "dragging an invisible time slider" or "scrubbing". The present invention enables these two types of drags to be seamlessly combined in a way that is well defined, controllable, and corresponds to a user's expectations.

Figure 14:
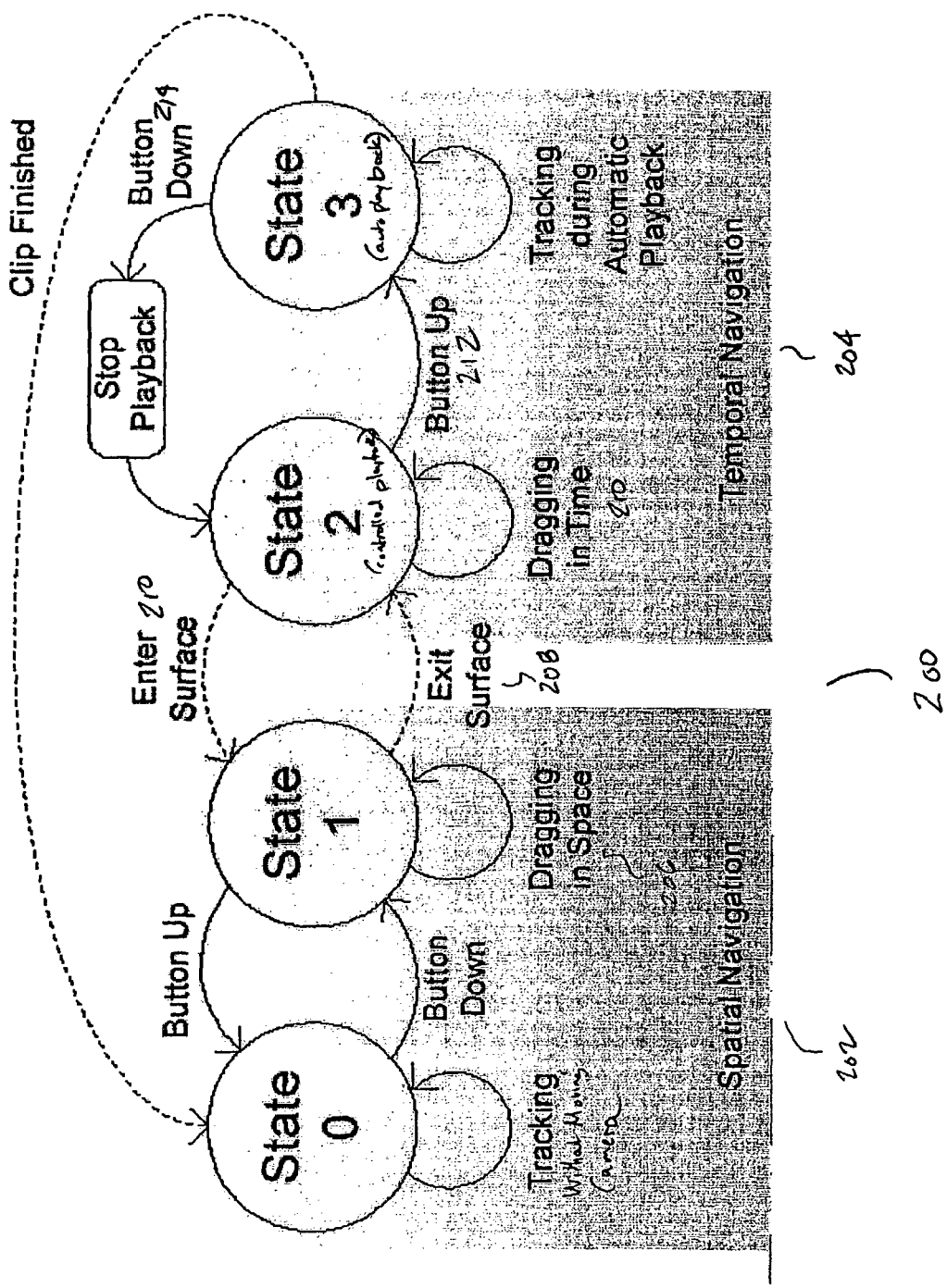
FIG. 14 shows a finite-state-machine model 200 that describes interaction states and transitions.

FIG. 14 shows a finite-state-machine model 200 that describes interaction states and transitions. A key feature of the model 200 is the ability to transition back and forth from spatial navigation mode 202 to temporal navigation mode 204 during a continuous or ongoing drag. As a user drags or moves 206 the camera across a camera surface (State 1, Spatial Navigation) and hits the edge of the surface being navigated, a transition (Exit Surface) 208 is made to continue dragging that controls an invisible or hypothetical time slider (State 2, Temporal Navigation). As the user continues to drag in time 210, the drag controls the location or current frame in the animation clip (assuming that the author has specified the clip to be under user control, as opposed to simple automatic playback). Upon reaching the end of the animation, a return (Enter Surface) 210 back to State 1 is made with continued dragging of the camera in space 206 (however, on a different, destination camera surface).

The interaction model 200 also handles a variety of reasonable variations on this type of dragging behavior. A user may stop moving when dragging in time 210 an animation clip, thus pausing the animation. If, however, when in State 2 the user releases the mouse button 212, automatic playback is invoked to carry the user to the next camera surface (State 3). Should the user press the mouse button 214 during this automatic playback (State 3), automatic playback is stopped (State 3 is exited) and temporal dragging in time 210 control by the user is resumed (return to State 2). Empirical observation has indicated that this interaction design enhances a user's feeling of being in control throughout the entire navigation experience.

Figure 15:
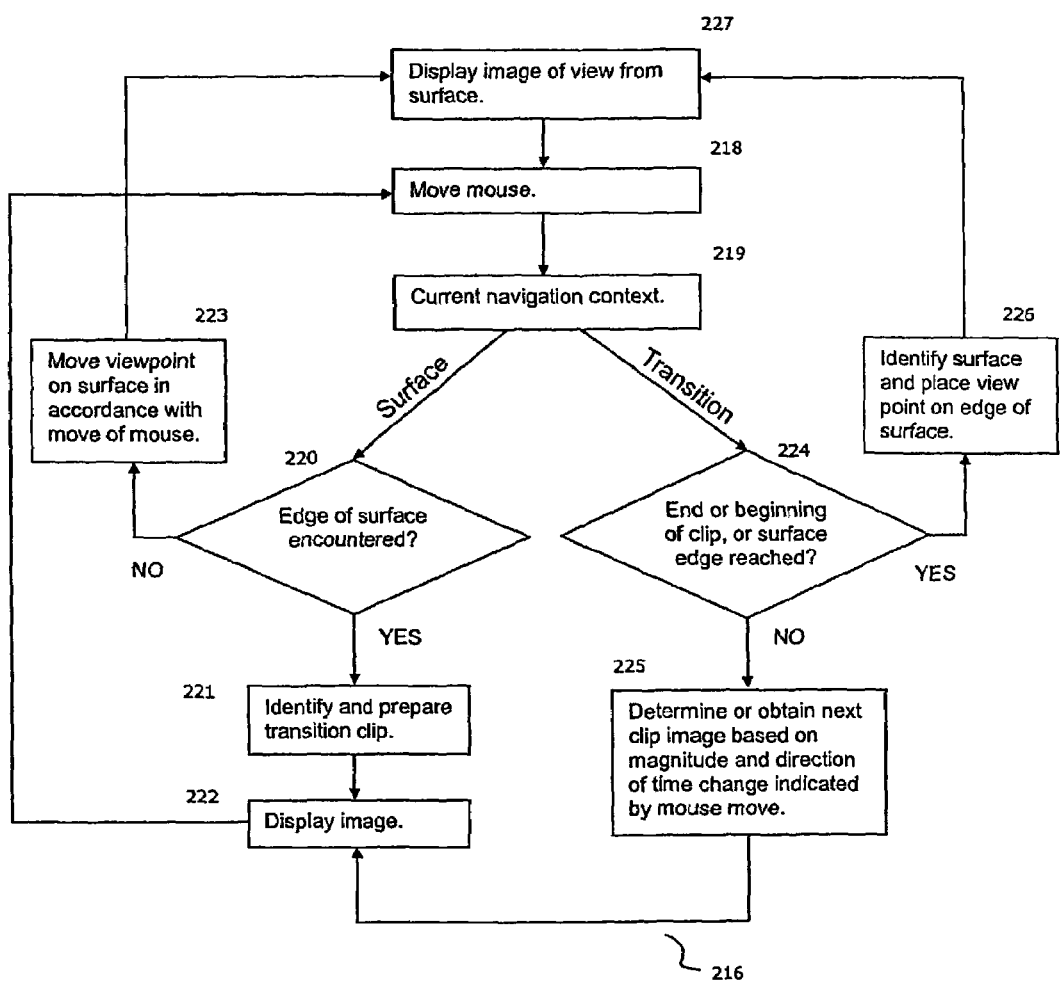
FIG. 15 shows a flow diagram 216 for integrated control.

FIG. 15 shows a flow diagram 216 for integrated control. A user moves 218 a mouse. If the current navigation context is a surface, then it is determined 219 whether an edge of the surface has been encountered. If an edge has been encountered 220, then a transition clip is identified and prepared 221, and an image is displayed 222. If an edge has not been encountered 220, then the viewpoint is moved 223 on the surface in accordance with the movement 218 of the mouse.

If the current navigation context 219 after the mouse movement 218 is a transition, and if the end or beginning of the clip (or the surface of an approaching edge) has not been reached 224, then the system determines or obtains 225 a next clip image or frame based on a magnitude and direction (forward/backward) of time change as indicated by the mouse move 218, and displays 222 the determined or obtained 225 clip image or frame. If the end or beginning of the clip (or the surface of an approaching edge) has been reached 224, then the system identifies the surface and places 226 the viewpoint on the edge of the surface. Following either the viewpoint placement at stage 226 or the viewpoint movement at stage 223, the system displays 227 an image of the view from the placed 226 or moved 223 viewpoint, for example by rendering the viewpoint or retrieving an image representing the viewpoint.

Figure 16:
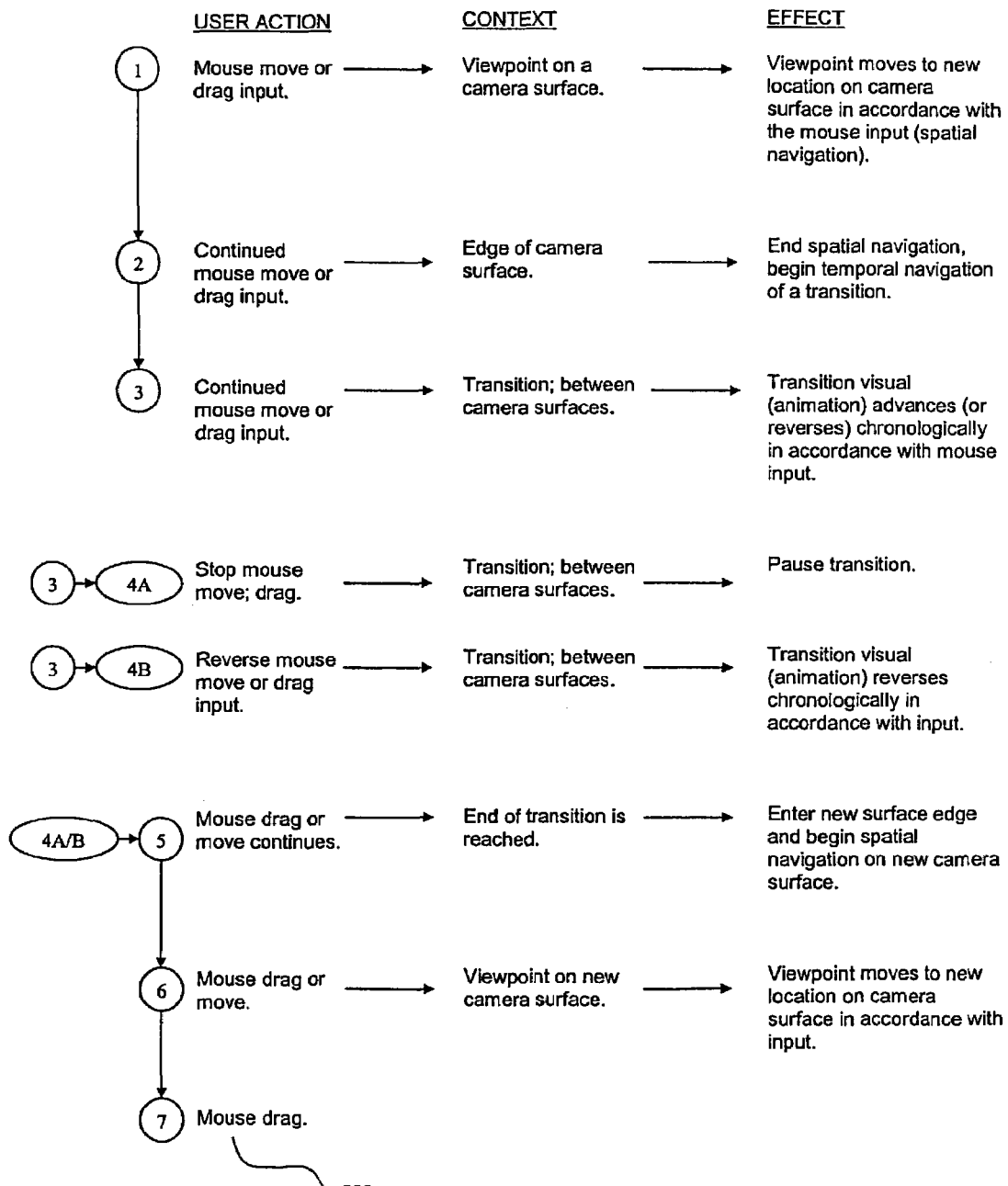
FIG. 16 shows an example of a series of interactions 228 that might occur with the model 200 of FIG. 14 or the flow diagram 216 of FIG. 15.

FIG. 16 shows an example of a series of interactions 228 that might occur with the model 200 of FIG. 14 or the flow diagram 216 of FIG. 15. A continuous user action (mouse drag or movement), depending on the context, can control spatial navigation, can control temporal navigation, or can seamlessly control changes between the two modes of navigation.

EXAMPLE FRAMEWORK AND INTERACTION EXPERIENCE

Figure 17:
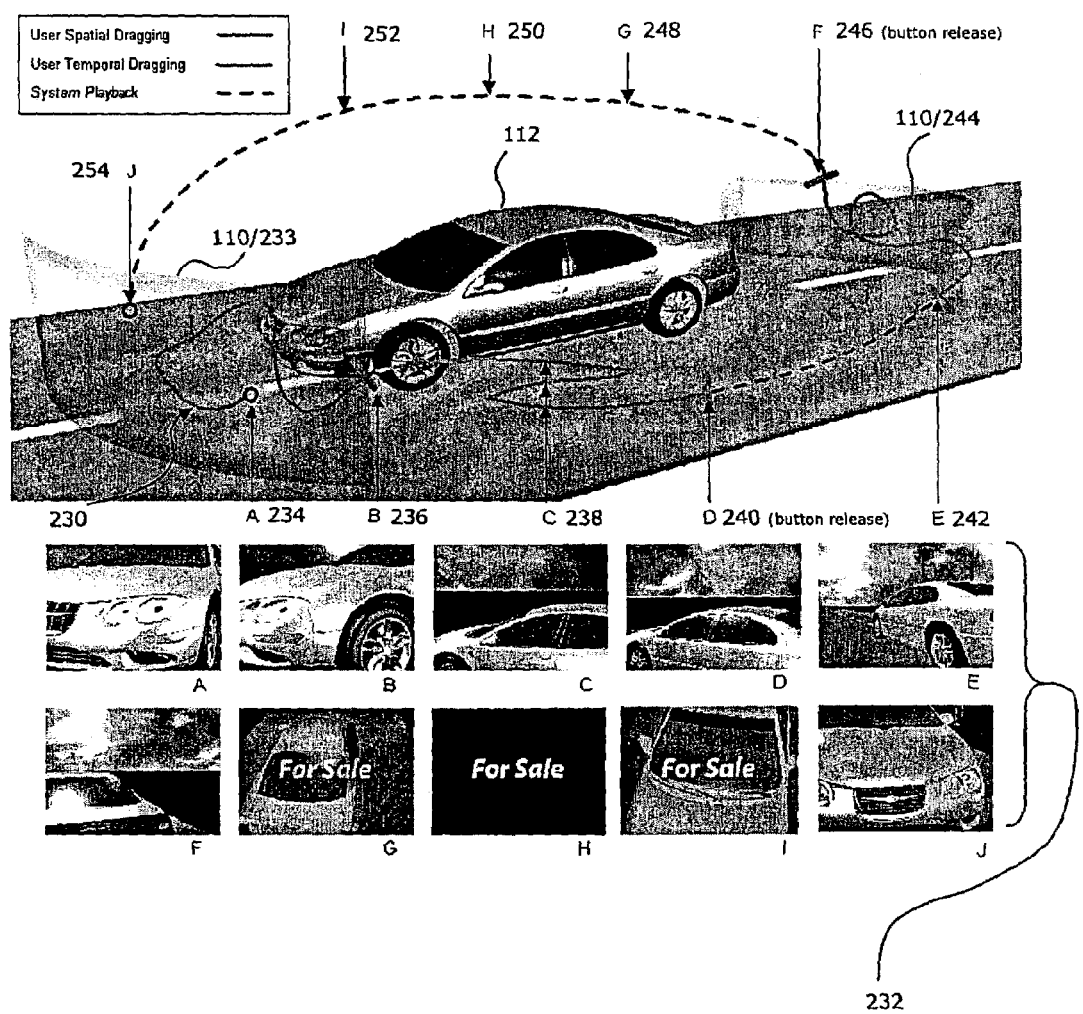
FIG. 17 shows an example of a navigation sequence 230.

FIG. 17 shows an example of a navigation sequence 230. Screen shots (A-J) 232 show what the user actually sees during the navigation sequence 230 at positions A 234 through J 254. Screen shot A 232 corresponds to Position A 234, screen shot B 232 corresponds to Position B 236, etc.

At Position A 234 the user starts by dragging on a first camera surface 110/233 which moves or translates the viewpoint or virtual camera on the surface 233. The path A-B shows the camera being dragged on the first surface 233 (spatial navigation).

At Position B 236, the user reaches the edge of the first camera surface 233, which automatically initiates an animation that will transition the user from Position B 236 to Position E 242. In this example, the transition from Position B 236 to Position E 242 is an automatic interpolation or animation between the two positions. The zig-zag path from B to D indicates drag movement that scrubs the time on the animation (temporal navigation).

Position C 238 illustrates an intermediate point in the animation that gets seen three times during the interaction by scrubbing to reverse back before Position C 238 and then scrubbing forward and again passing position C 238.

At position D 240, the user releases the mouse button, whereupon the system automatically plays back the remainder of the automatic or interpolated animation. Preferably, the pacing of the automatic playback is specified in advance by the author.

At position E 242, the user enters a second camera surface 110/244 and resumes spatial navigation of the camera as shown by path E-F. When the user exits the second camera surface 244 at position F 246, another animation is launched that will transition the user to position J 254. Since the user releases the mouse button at position F, the animation from F to J is played back at the authored pacing.

Because the transition between the second surface 244 to the first surface 233 is a slate animation, the intermediate shots at Positions G 248, H 250, and I 252 along the path F-J are of slates containing information on the car subject 112 fading in and out as the camera pans over the top of the car subject 112. The net result of this navigation experience is a visually rich view of the car subject 112 that is influenced by an author who intends to convey a certain message, rather than using multiple camera controls typical of current 3D viewers.

Implementation Details, Empirical Results, Additional Features

The present invention may be implemented using Alias|wavefront's MAYA 3D modeling and animation package. MAYA may be used to author the 3D content to be visualized, camera surfaces, animation clips, and associations between them. Preferably, a custom written MAYA plugin allows the user to control their view of the 3D content based on their mouse input and the authored camera surfaces, animation clips, and associations.

Money-shot viewpoints may be created by defining a MAYA camera with specific position, orientation, and other camera parameters. Camera surfaces which intersect the positions of the money-shot viewpoints may be defined by creating an appropriate non-trimmed NURBS surface within MAYA. To include an optional camera look-at point (a point to which the camera is pointed or "looks at"), the author may define a point in 3D space (using a MAYA locator). Finally, to make these components easily locatable by the plugin, they should be grouped under a named MAYA node within its dependency graph.

Animation clips may be created as one would normally create animations in MAYA; using its TRAX non-linear animation editor. Animation clips should be given meaningful, consistent, names in order to facilitate their identification later when associating them with events.

Figure 18:
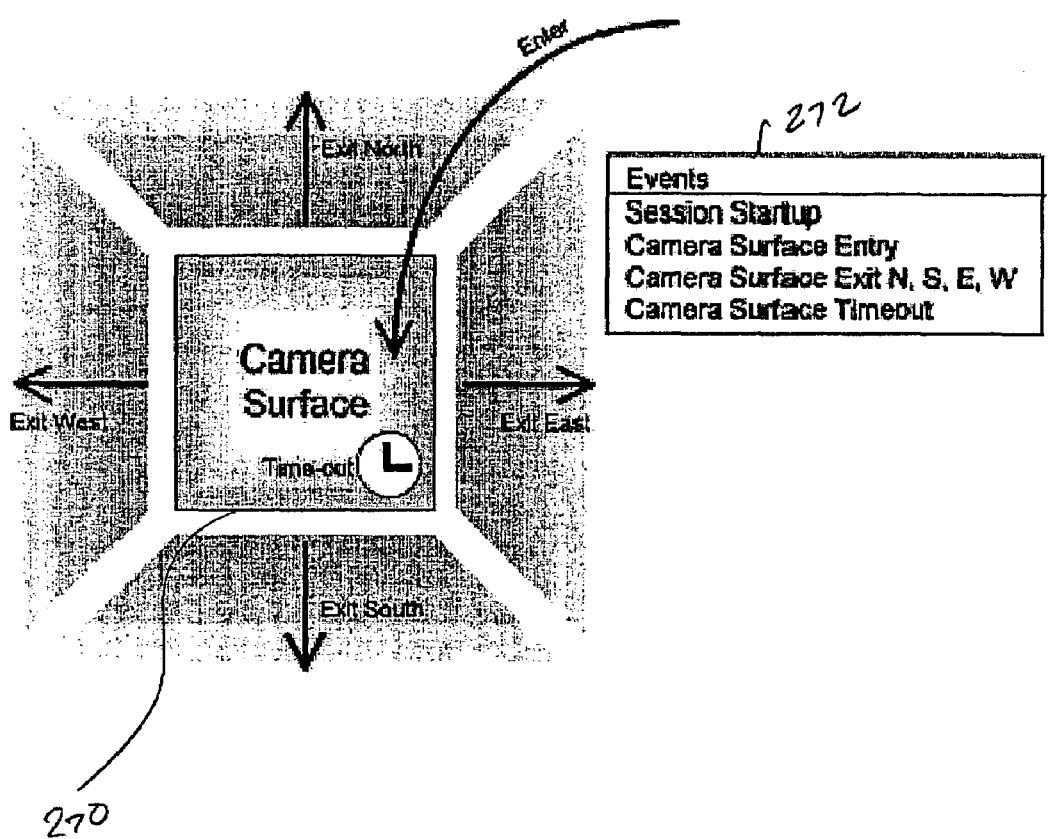
FIG. 18 shows a camera surface 270 and events 272.

Authors may create scripts and associate them with events. Preferably, supported events include: session startup, camera surface entry, camera surface exit, and camera surface timeout. FIG. 18 shows a camera surface 270 and events 272. The session startup event is triggered only once when the user initially begins using navigating or viewing a scene or navigation framework. Exit events are triggered when the user leaves a camera surface from preferably one of four directions. Associated scripts can specify a destination camera surface or alter the state of navigation (e.g. activate or deactivate a surface). Time-out events are triggered when the mouse is idle for a given duration while on a particular camera surface, and can be used to launch an automatic presentation. The plugin's event and script mechanism provides for the use of authored logic to dynamically alter the presentation. For example, scripts can ensure that some surfaces are only visited once, while others are shown only after certain surfaces have already been visited.

When the plugin is activated, the session start-up event is triggered, and typically, the first money-shot of the first camera surface is used as the initial view. If a look-at point is defined for this camera surface, the orientation of the user camera is set such that the camera points directly at the look-at point. Otherwise, the orientation is preferably set to the normal of the camera surface at the money-shot viewpoint's position. The user's mouse movements and button presses are monitored by the plugin.

Central to the present invention is the integration of spatial and temporal controls into a single user interaction model. The implications of this interaction model go beyond a simple interaction technique. The blending of spatial and temporal control presents a completely new issue that an author needs to understand and consider when creating interactive visual experiences. Temporal control can feel like spatial control (even when scrubbing backwards in an animation) when the animation consists of moving the viewing camera around the central object of interest. If the animation is not around the central object of interest, for example in certain slate animations, temporal control can produce different sensations, such as the feeling of moving backwards in time, interruption of a well paced animation, jarring or ugly visuals, and sometimes nonsensical content. Consequently, authors need to be cognizant of these phenomena and accordingly make design decisions as to when, where, and how much control to relinquish to the user. At one extreme, the author can specify that certain animations are completely uninterruptible by the user. Experience indicates that the types of transitions favored by users may depend heavily on the content being navigated.

Animations may be partially interruptible. For example, the author may prohibit movement or scrubbing backwards in time but allow the user to control forward pacing.

To indicate to users what type of control they have at any given time, it may be helpful to include visuals or hints that indicate the switching between spatial and temporal control. An explicit mechanism for informing the user of the current or upcoming control possibilities may also be included. In addition to using on-screen visual indicators (e.g., changing cursors) to indicate navigation state, "hint-ahead" mechanisms may be included to indicate what the upcoming content will be if the user stays on their current course of travel. For example, as the user reaches the edge of a camera surface, a "voice-over" could say something like "now we're heading towards the engine of the car". Alternatively, a visual "signpost" could fade-in near the cursor location to convey this information. These ideas coincide with research that states that navigation routes are preferably discoverable by the user.

A navigation may be made further interactive by the inclusion of interactive widgets or controls or clip sequences, that when "passed over", are activated. Hot-links or jump-points may be included to jump between locations in a navigation framework. Authorship elements such as camera surfaces may be made visible or semi-transparent. With dynamic constructs such as event triggered scripts and navigation state variables, new camera surfaces may be uncovered (like an onion skin), or previously navigated surfaces may be deactivated. Transitions may be symmetrical or asymmetrical. For example, one transition effect or animation may be used when transitioning from a first surface to a second surface, and another different transition effect may be used when transitioning from the second surface to the first. Another example of an asymmetrical transition would be when one transition effect or animation is used when transitioning from a first surface to a second surface, but when leaving the second surface from the same edge, the view transitions to a third surface, instead of the original first surface. Other possible effects include displaying the hypothetical time slider during transition, moving surfaces, picture-in-picture slates, hybrid transitions such as displaying a slate on one part of a transition and displaying a clip on another part of the transition. Authored animation paths for transitions may also be "transition surfaces" (see FIG. 3).

When a rendered 3D model or scene is being navigated, the model itself may be animated and synchronized with transitions.

Figure 19:
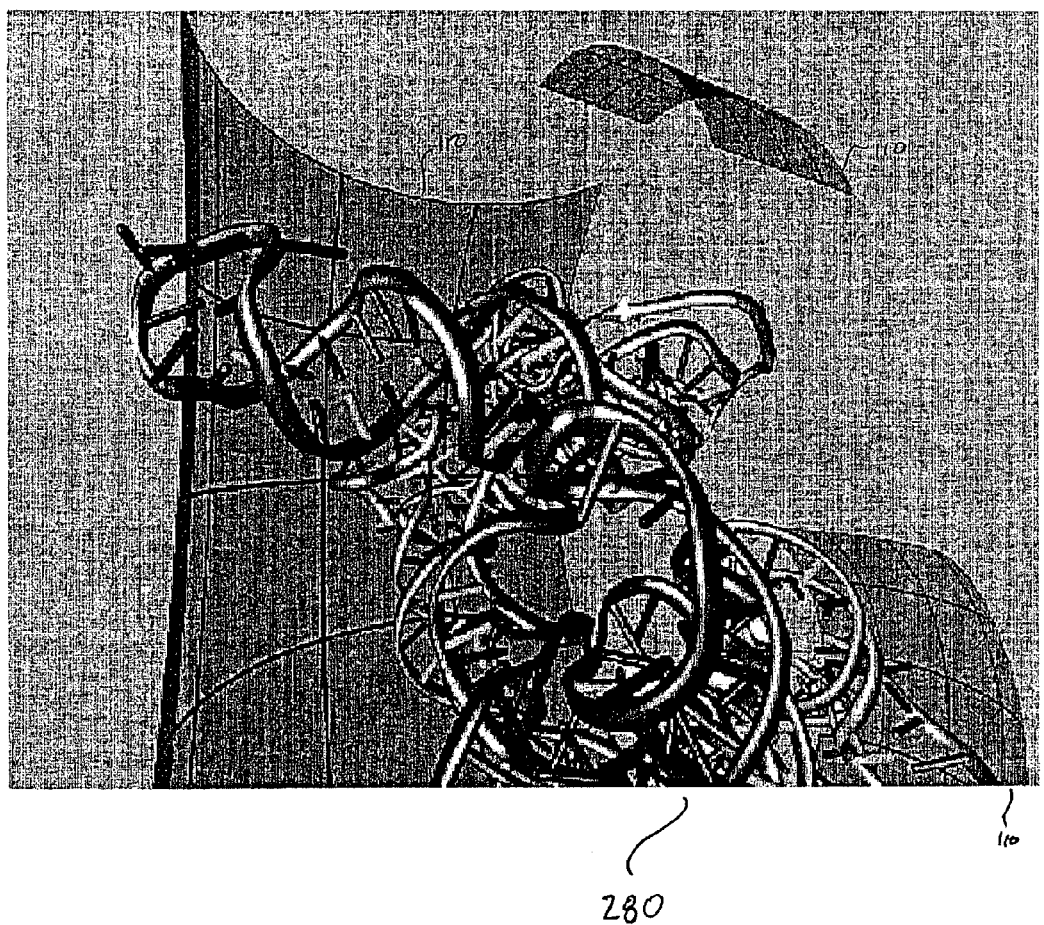
FIG. 19 shows a molecule 280 for navigation.
Figure 20:
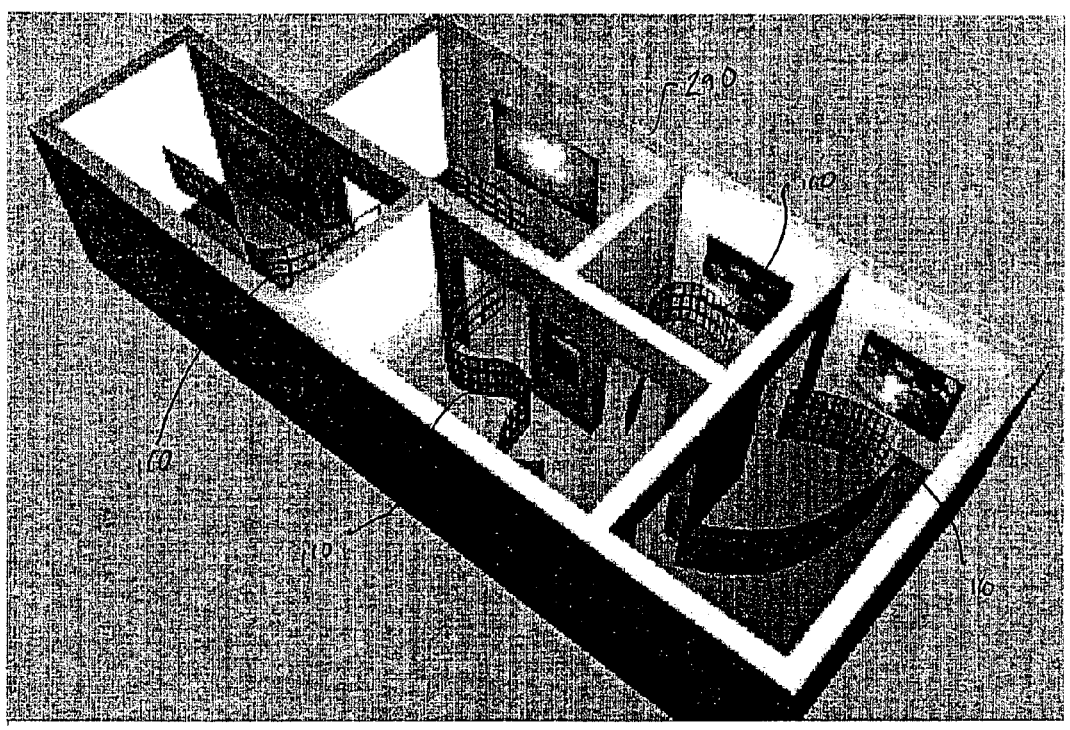
FIG. 20 shows a scene 290 for navigation.
Figure 21:
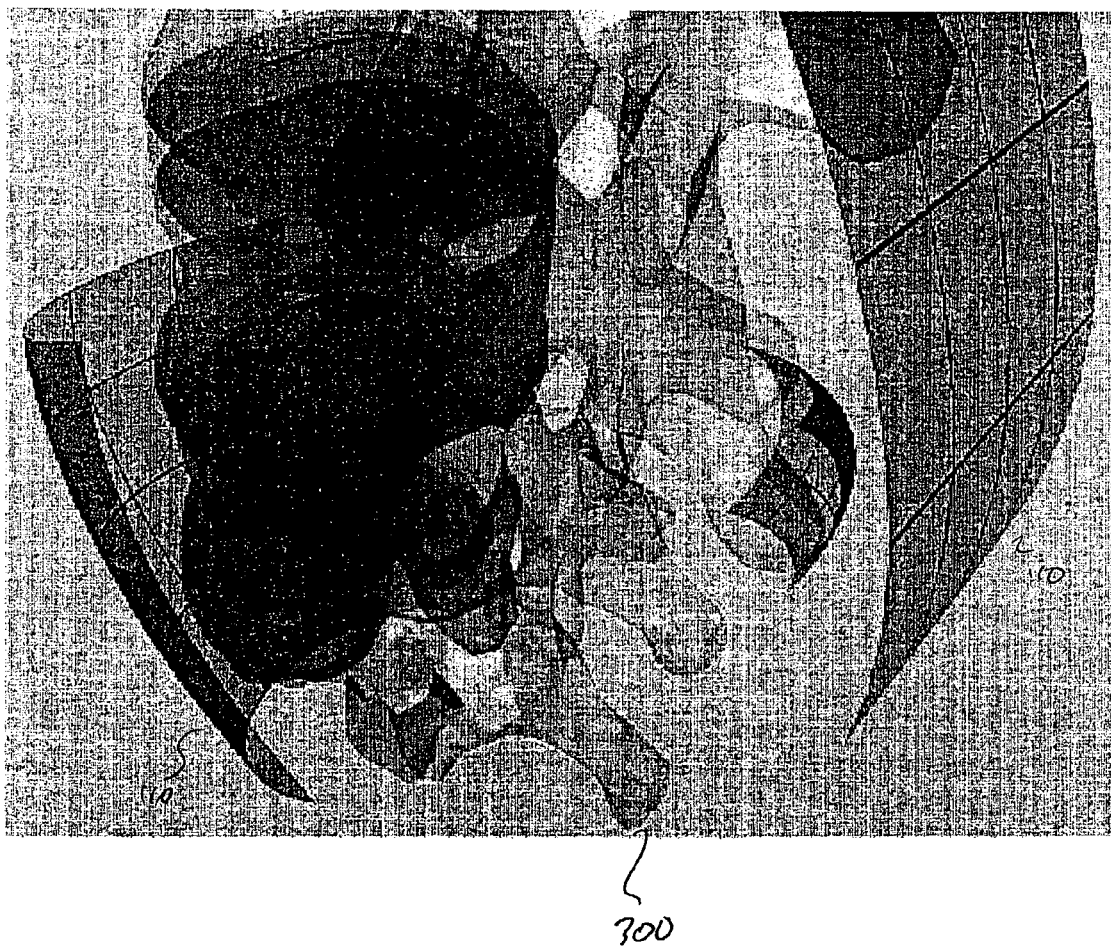
FIG. 21 shows a 3D medical subject 300 for navigation.

Finally, it is important to note that the present invention is not limited to product or automobile visualization. Other domains such as visualization of building interiors and medical applications are also suitable to the navigation techniques of the present invention. FIG. 19 shows a molecule 280 for navigation. FIG. 20 shows a scene 290 for navigation. FIG. 21 shows a 3D medical subject 300 for navigation.

Figure 22:
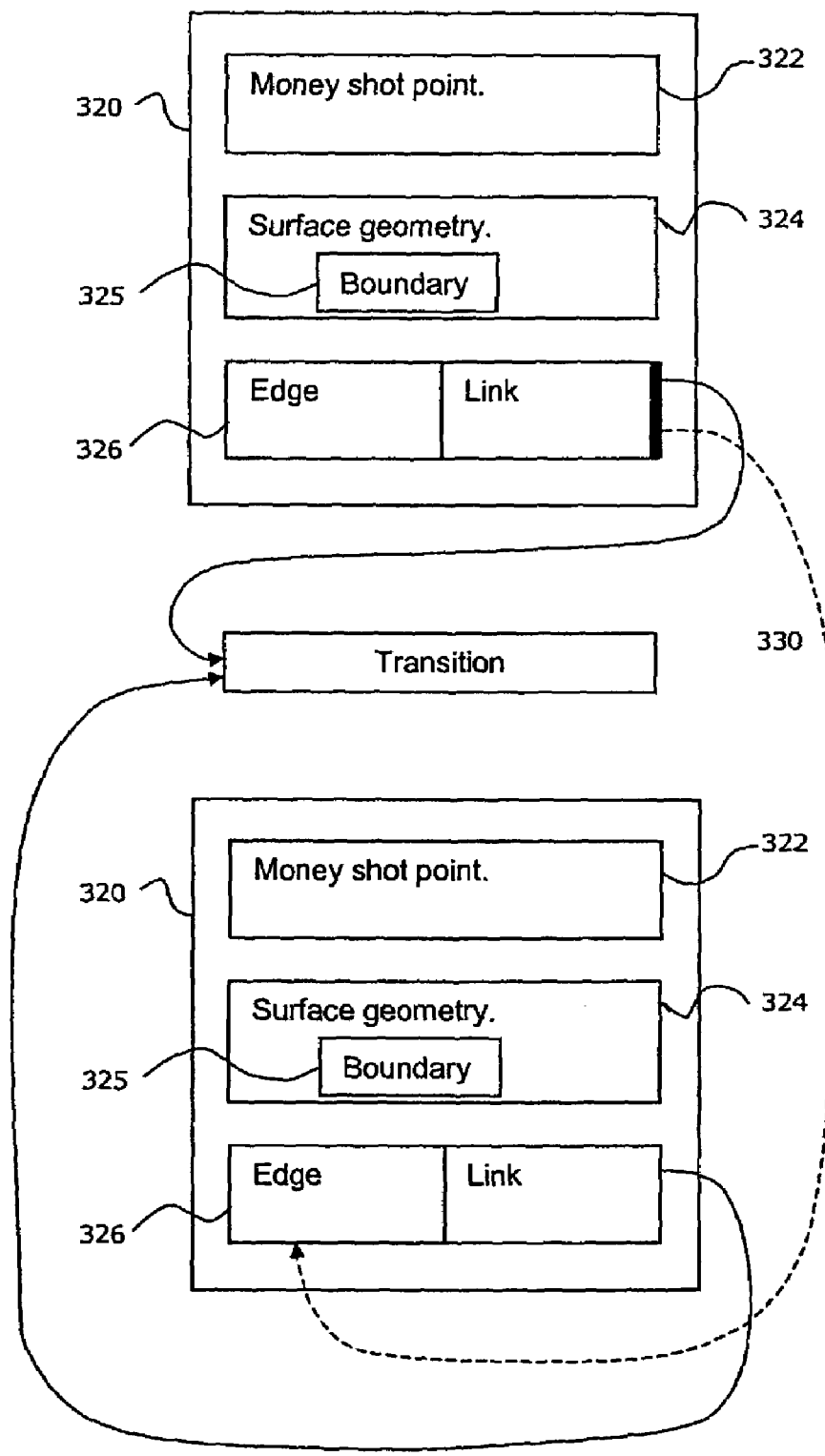
FIG. 22 shows a data structure of the present invention.

FIG. 22 shows a data structure of the present invention. Camera surface structures 320, each having a money-shot point 322 (optional), information describing the geometry 324 (possibly including boundary information 325), an edge 326 with a link such as a transition ID 328 to a transition 330. Other structures may also be used. For example, rather than a link 326 to a transition 328, the surface structure may have a link 332 to an edge 326 of another surface structure 320.

FIG. 23 shows hardware of the present invention. The present invention is included in a system 340, such as depicted in FIG. 23, which includes a display 342 upon which an output of the present invention may be displayed. A computer or CPU 344, preferably of high performance workstation type, performs the processes described herein and an input device 346, such as a mouse or stylus with pad, is used to control functionality described herein. The system 340 also includes storage (not shown), such as disc storage and RAM in which the processes of the present invention can be stored and on which the processes can be distributed. The processes can also be distributed via a network, such as the Internet.

The present invention has been described with respect to a system or method for unified spatial and temporal control, which allows a user to spatially move a viewpoint on a first viewpoint surface, and which allows a user to temporally control a sequence of transition images when spatial movement on the first viewpoint surface encounters an edge of the first viewpoint surface.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising
    determining by a processor, that a viewpoint or virtual camera for viewing a model or scene has been interactively translated off of or to a pre-defined point or edge of a first camera 3D surface or viewpoint surface;
    in response to the determining, transitioning the viewpoint or virtual camera to a second camera 3D surface or viewpoint surface that is not adjacent to the first camera 3D surface or viewpoint surface; and
    temporally controlling by the processor, display of a transitional effect having a timeline allowing rewind and forward time control using a same interaction method used for spatial navigation control;
    displaying a transitional effect during the transitioning; and
    temporally controlling the displaying of the transitional effect, and
    wherein the transitional effect is at least one of a pre-determined video clip, an interpolation of the viewpoint or virtual camera moving from the first camera surface to the second camera surface, a two-dimensional slate, a pre-arranged camera movement, and a combination or concatenation of two or more of the preceding transitional effects.

2. A method, comprising
    controlling by a processor, a transition effect having a timeline allowing rewind and forward time control when a viewpoint or virtual camera is interactively moved out of or off of an original 3D camera surface occurring when the viewpoint or virtual camera reaches an edge of the original camera surface, and interactively inputting a continuous stream of two-dimensional data to translate the viewpoint or virtual camera on the original camera surface, and then transitioning the viewpoint or virtual camera to a nonadjacent destination camera surface;
    displaying a transitional effect during the transitioning; and
    temporally controlling the displaying of the transitional effect with the continuous stream of two-dimensional data, and
    wherein the transitional effect is at least one of a pre-determined video clip, an interpolation of the viewpoint or virtual camera moving from the original camera surface to the destination camera surface, a two-dimensional slate, a pre-arranged camera movement, and a combination or concatenation of two or more of the preceding transitional effects.

3. A method according to claim 2, wherein the moving out of or off of the original camera surface occurs when the viewpoint or virtual camera reaches a pre-defined point on the original camera surface.

4. A method according to claim 2, wherein the moving out of or off of the original surface activates an event that changes an interaction state associated with the original camera surface.

5. A method according to claim 4, wherein the temporal controlling directly follows the translating, in response to the viewpoint or virtual camera moving out of or off of the camera surface.

6. A method according to claim 5, wherein the controlling occurs while continuing to interactively inputting the stream of two-dimensional data.

7. A method according to claim 2, wherein a gain of the translation automatically changes according to a position of the view on the original camera surface.

8. A method according to claim 2, wherein the transitioning is constrained to a transition surface relating the nonadjacent camera surface to the original camera surface.

9. A method, comprising
    controlling by a processor, a transition effect having a timeline when a viewpoint or virtual camera is interactively moved out of or off of an original 3D camera surface;
    displaying a view from the viewpoint or virtual camera on the original camera surface, which is nonadjacent to a destination camera surface;
    interactively inputting a continuous stream of two-dimensional data to translate the viewpoint or virtual camera on the original camera surface;
    transitioning the viewpoint or virtual camera to the nonadjacent destination camera surface;
    displaying a transitional effect during the transitioning; and
    temporally controlling the displaying of the transitional effect with the continuous stream of two-dimensional data, and
    wherein the transitional effect is at least one of a pre-determined video clip, an interpolation of the viewpoint or virtual camera moving from the original camera surface to the destination camera surface, a two-dimensional slate, a pre-arranged camera movement, and a combination or concatenation of two or more of the preceding transitional effects.

10. A method of unified spatial and temporal control, comprising:
   allowing a user to spatially move a viewpoint on a first viewpoint surface using a computer with a processor; and
   allowing a user to temporally control rewind and forward time of a sequence of transition images when spatial movement on the first viewpoint surface encounters an edge or predefined point of the first viewpoint surface;
   interactively inputting a continuous stream of two-dimensional data to translate the viewpoint on the first viewpoint surface, and then transitioning the viewpoint to a nonadjacent destination camera surface;
   displaying a transitional effect during the transitioning; and
   temporally controlling the displaying of the transitional effect with the continuous stream of two-dimensional data, and
   wherein the transitional effect is at least one of a pre-determined video clip, an interpolation of the viewpoint or virtual camera moving from the first viewpoint surface to the destination camera surface, a two-dimensional slate, a pre-arranged camera movement, and a combination or concatenation of two or more of the preceding transitional effects.

11. A method according to claim 10, wherein encountering the edge activates an event that changes an interaction state associated with the viewpoint.

12. A method of integrated spatial and temporal navigation, comprising:
   determining by a processor, that a viewpoint or virtual camera for viewing a model or scene has been interactively translated off of or to a pre-defined point or edge of a first camera 3D surface or viewpoint surface;
   in response to the determining, transitioning the viewpoint or virtual camera to a second camera 3D surface or viewpoint surface that is not adjacent to the first camera 3D surface or viewpoint surface;
   enabling temporal navigation of display of an animation having a timeline allowing rewind and forward time control during the transitioning;
   displaying a transitional effect during the transitioning; and
   temporally controlling the displaying of the transitional effect, and
   wherein the transitional effect is at least one of a pre-determined video clip, an interpolation of the viewpoint or virtual camera moving from the first camera surface to the second camera surface, a two-dimensional slate, a pre-arranged camera movement, and a combination or concatenation of two or more of the preceding transitional effects.

13. A method according to claim 12, wherein the transitioning is based on a transition surface relating the first and second camera surfaces.

14. A method according to claim 12, wherein encountering the predefined point or edge activates an event that changes an interaction state associated with the viewpoint or virtual camera.

15. A method according to claim 12, wherein, in further response to the determining, activating a script or programmatic logic.

16. A method according to claim 12, wherein, in further response to the determining, activating a script or programmatic logic that in turn dynamically changes an interaction state associated with the camera surfaces.

17. A method according to claim 12, wherein a single continuous drag or stroke input controls both the translation and the temporal navigation.

18. A method according to claim 12, wherein a same mode of interactive control of the viewpoint or virtual camera is kept active for both the temporal navigation and the interactive translating.

19. A method of integrated navigation control, comprising:
   displaying or rendering by a processor, a subject or scene according to a current viewpoint on an original camera 3D surface that is facing the subject or scene and that is spatially separated from a destination viewing surface that is also facing the subject or scene;
   generating a continuous stream of two-dimensional input data;
   according to a first portion of the two-dimensional input data, translating the current viewpoint on the original camera 3D surface;
   after the translating and according to a later portion of the continuous stream of two-dimensional input data, temporally controlling by the processor, the display of a transition effect having a timeline allowing rewind and forward time control as the current viewpoint transitions from the original camera 3D surface to the destination camera 3d surface;
   displaying a transitional effect during the transitioning; and
   temporally controlling the displaying of the transitional effect with the continuous stream of two-dimensional data, and
   wherein the transitional effect is at least one of a pre-determined video clip, an interpolation of the viewpoint or virtual camera moving from the original camera 3D surface to the destination camera 3d surface, a two-dimensional slate, a pre-arranged camera movement, and a combination or concatenation of two or more of the preceding transitional effects.

20. A method according to claim 19, wherein the temporal control is constrained to one of a transition surface and a transition path relating the original and destination camera surfaces.

21. A method according to claim 19, further comprising manipulating an input device to generate the continuous stream of two-dimensional input data.

22. A method according to claim 19, wherein a gain affecting the translation automatically changes according to a position of the current viewpoint on the original view surface.

23. A method of integrated navigation control, comprising:
   displaying or rendering by a processor, a subject or scene according to a current viewpoint on an original camera 3D surface that is facing the subject or scene and that is spatially separated from a destination viewing surface that is also facing the subject or scene;
   generating a continuous stream of two-dimensional input data;
   according to a first portion of the two-dimensional input data, translating the current viewpoint on the original camera 3D surface; and
   after the translating and according to a later portion of the continuous stream of two-dimensional input data, temporally controlling by the processor, the display of a transition effect having a timeline as the current viewpoint transitions from the original camera 3D surface to the destination camera 3d surface, and
   wherein the transition effect is at least one of a pre-determined video clip, an interpolated movement of the current view from the original viewing surface to the destination viewing surface, an image, a slate, a pre-arranged camera movement, an animation, and a combination of two or more of the preceding transition effects.

24. A method, comprising determining by a processor, that a viewpoint or virtual camera for viewing a model or scene has been interactively translated off of or to a pre-defined point or edge of a first camera 3D region;
   in response to the determining, transitioning the viewpoint or virtual camera to a second camera 3D region that is not adjacent to the first camera 3D region;
   interactively controlling by the processor, a rate of display of a visual transition having a timeline for transition between the first and second camera regions which are spatially navigable;
   displaying a transitional effect during the transitioning; and
   temporally controlling the displaying of the transitional effect, and
   wherein the transitional effect is at least one of a pre-determined video clip, an interpolation of the viewpoint or virtual camera moving from the first camera 3D region to the second camera 3D region, a two-dimensional slate, a pre-arranged camera movement, and a combination or concatenation of two or more of the preceding transitional effects.

25. A method according to claim 24, wherein the controlling is done with a same interaction control technique used to spatially navigate the two regions.

26. A method according to claim 25, wherein the visual transition is displayed while transitioning between the two regions.

27. A method according to claim 26, wherein the spatially navigable regions are regions within which a viewpoint is translated according to input generated with the interaction technique.

28. A method according to claim 27, wherein in response to the input generated with the interaction technique for translating the viewpoint to a periphery of one of the regions, controlling the rate of display of the visual transition according to continued and uninterrupted generation of the input with the interaction technique.

29. A method, comprising:
   determining by a processor, that a viewpoint or virtual camera for viewing a model or scene has been interactively translated off of or to a pre-defined point or edge of a first camera 3D surface or viewpoint surface;
   in response to the determining, transitioning the viewpoint or virtual camera to a second camera 3D surface or viewpoint surface that is not adjacent to the first camera 3D surface or viewpoint surface;
   seamlessly switching by the processor, from an interactive spatial navigation mode to an interactive temporal display mode having a timeline with one ongoing interactive input operation;
   displaying a transitional effect during the transitioning; and
   temporally controlling the displaying of the transitional effect, and
   wherein the transitional effect is at least one of a pre-determined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

30. A method according to claim 29, wherein the switching is responsive to one of navigating into or out of an area for spatial navigation.

31. A method according to claim 29, wherein the interactive input command is one of a stroke operation or a drag operation.

32. A method, comprising:
   interactively generating input data with a constant mode of interactive control;
   according to a first part of the input data, spatially navigating a subject by determining by a processor, spatial navigation points in a bounded locus of three-dimensional spatially navigable points, where, before the generating, the locus of points are arranged in relation to the subject to be viewed;
   displaying images portraying the subject as viewed from the determined spatial navigation points;
   after displaying the images, and when the spatial navigating indicates navigation out of or off of the locus of points, using a second part of the continuous stream of two-dimensional input data to control a rate of displaying by the processor, a sequence of other images allowing rewind and forward time control; where the second part of the continuous stream of input data chronologically follows the first part of the continuous stream of input data;
   displaying a transitional effect during the navigating; and
   temporally controlling the displaying of the transitional effect with the two-dimensional input data, and
   wherein the transitional effect is at least one of a pre-determined video clip, an interpolation of a viewpoint or virtual camera moving from the locus of points, a two-dimensional slate, a pre-arranged camera movement, and a combination or concatenation of two or more of the preceding transitional effects.

33. A method for interactive visual navigation, comprising:
   interactively generating a continuous stream of two-dimensional input data with a single mode of interaction;
   according to a first part of the continuous stream of two-dimensional input data, spatially navigating a subject by determining by a processor, spatial navigation points in a bounded locus of three-dimensional spatially navigable points, where before the generating the locus of points are arranged in relation to the subject to be viewed;
   displaying images portraying the subject as viewed from the determined spatial navigation points;
   after displaying the images, and when the spatial navigating indicates navigation out of or off of the locus of points, using a second part of the continuous stream of two-dimensional input data to control a rate of displaying by the processor, a sequence of other images allowing rewind and forward time control; where the second part of the continuous stream of input data chronologically follows the first part of the continuous stream of input data;
   displaying a transitional effect during the navigating; and
   temporally controlling the displaying of the transitional effect with the two-dimensional input data, and
   wherein the transitional effect is at least one of a pre-determined video clip, an interpolation of a viewpoint or virtual camera moving from the locus of points, a two-dimensional slate, a pre-arranged camera movement, and a combination or concatenation of two or more of the preceding transitional effects.

34. A method of integrated spatial and temporal navigation of a virtual space, comprising:

displaying by a processor, a rendering or image portraying the virtual space as viewed by a virtual camera at a first location on or in a spatially navigable camera surface within the virtual space, where the virtual camera has an orientation that is either normal to the spatially navigable camera surface or is pointed toward a fixed look-at point in the virtual space;

beginning a drag or move operation of a two-dimensional input device;

based on the moving or dragging, by the processor, spatially translating the virtual camera from the first location in the spatially navigable region to a second location in or on the spatially navigable region;

automatically setting the orientation of the virtual camera at the second location to either point towards the pre-defined look-at point or to point in a direction normal to the spatially navigable region at the second location;

displaying by the processor, a rendering or image portraying the virtual space in accordance with the location and orientation of the virtual camera at the second location in the spatially navigable camera surface;

continuing the drag or move operation of the two-dimensional input device;

determining by the processor, that further translating the virtual camera according to the continued dragging or moving of the two-dimensional input device would place the virtual camera beyond the spatially navigable region;

in response to the determining, beginning the display of a transition comprising at least one of an interpolated animation of the virtual camera, an animation semi-transparently blended with a slate, and a pre-authored animation of the virtual camera;

while further continuing the drag or move operation of the two-dimensional input device, performing at least one of advancing display of the transition based on the further continuing drag or move operation of the two-dimensional input device causing forward time control, reversing display of the transition based on the further continuing drag or move operation of the two-dimensional input device causing rewind time control, and pausing, stopping, or automatically completing display of the transition based on cessation of the drag or move operation of the two-dimensional input device;

displaying a transitional effect during the spatial translating; and temporally controlling the displaying of the transitional effect, and wherein the transitional effect is at least one of a pre-determined video clip, an interpolation of the virtual camera moving from the first location to the second location, a two-dimensional slate, a pre-arranged camera movement, and a combination or concatenation of two or more of the preceding transitional effects.

35. A computer readable storage containing a data structure for controlling a computer, the data structure comprising:

a viewpoint or virtual camera for viewing a model or scene has been interactively translated off of or to a pre-defined point or edge of a first camera 3D surface or viewpoint surface and the viewpoint or virtual camera is transitioned to a second camera 3D surface or viewpoint surface that is not adjacent to the first camera 3D surface or viewpoint surface;

the first and second camera surfaces are for constrained camera navigation not adjoining another, interrelated by transitions with timelines allowing rewind and forward time control which together define views of a scene or model that can be spatially navigated by a user;

displaying a transitional effect during the transitioning; and temporally controlling the displaying of the transitional effect, and wherein the transitional effect is at least one of a pre-determined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

36. A computer readable storage containing a data structure for controlling a computer, the data structure comprising:

data describing a set of mutually non-adjacent camera surfaces for constrained spatial camera navigation and for viewing a model or scene has been interactively translated off of or to a pre-defined point or edge including a first camera 3D surface or viewpoint surface which is transitioned to a second camera 3D surface or viewpoint surface that is not adjacent to the first camera 3D surface or viewpoint surface, displaying a transitional effect during the transitioning, temporally controlling the displaying of the transitional effect, wherein the transitional effect is at least one of a pre-determined video clip, an interpolation of a viewpoint or virtual camera moving from the first camera 3D surface to the second camera 3D surface, a two-dimensional slate, a pre-arranged camera movement, and a combination or concatenation of two or more of the preceding transitional effects; and data describing a set of interactively controllable timeline based transition effects between the surfaces allowing rewind and forward time control.

37. A data structure according to claim 36, wherein interacting to transition from navigation of a camera surface and control of a transition appears seamless to a user performing the interacting.

38. A computer readable storage containing a data structure for controlling a computer, the data structure comprising a set of non-adjacent camera surfaces that are spatially navigable and that are connected by interactively controllable visual temporal transitions allowing rewind and forward time control, a model or scene has been interactively translated off of or to a pre-defined point or edge including a first camera 3D surface or viewpoint surface which is transitioned to a second camera 3D surface or viewpoint surface that is not adjacent to the first camera 3D surface or viewpoint surface, a transitional effect displayed during the transitioning, a temporal control of displaying of the transitional effect, wherein the transitional effect is at least one of a pre-determined video clip, an interpolation of a viewpoint or virtual camera moving from the first camera 3D surface to the second camera 3D surface, a two-dimensional slate, a pre-arranged camera movement, and a combination or concatenation of two or more of the preceding transitional effects.

39. A computer readable storage containing a data structure for controlling a computer, the data structure comprising:

view surface boundaries including a first view surface boundary which is transitioned to a second view surface boundary that is not adjacent to the first view surface boundary, as a result of a viewpoint or virtual camera for viewing a model or scene has been interactively translated off of or to the first view surface boundary;

a timeline based transition between the view surface boundaries allowing rewind and forward time control;

a transition duration indicating a length of the transition;

a transitional effect during the transitioning; and a temporal control of the displaying of the transitional effect, wherein the transitional effect is at least one of a predetermined video clip, an interpolation of a viewpoint or virtual camera moving from the first camera 3D surface to the second camera 3D surface, a two-dimensional slate, a pre-arranged camera movement, and a combination or concatenation of two or more of the preceding transitional effects.

40. A computer-readable storage for enabling a computer to perform a process, the process comprising:

allowing a user to spatially move a viewpoint on a first viewpoint surface;

allowing a user to temporally control allowing rewind and forward time of a sequence of transition images when spatial movement on the first viewpoint surface encounters an edge or predefined point of the first viewpoint surface and transitioning the viewpoint to a second viewpoint surface that is not adjacent to the first viewpoint surface;

displaying a transitional effect during the transitioning; and temporally controlling the displaying of the transitional effect, and wherein the transitional effect is at least one of a predetermined video clip, an interpolation of a viewpoint or virtual camera moving from the first viewpoint surface to the second viewpoint surface, a two-dimensional slate, a pre-arranged camera movement, and a combination or concatenation of two or more of the preceding transitional effects.

41. A computer-readable storage for enabling a computer to perform a process, the process comprising:

determining that a viewpoint or virtual camera for viewing a model or scene has been interactively translated off of or to a pre-defined point or edge of a first camera 3D surface or viewpoint surface;

in response to the determining, transitioning the viewpoint or virtual camera to a second camera 3D surface or viewpoint surface that is not adjacent to the first camera surface or viewpoint surface;

enabling temporal navigation of display of an animation during the transitioning allowing rewind and forward time control;

displaying a transitional effect during the transitioning; and temporally controlling the displaying of the transitional effect, and wherein the transitional effect is at least one of a predetermined video clip, an interpolation of the viewpoint or virtual camera moving from the first viewpoint surface to the second viewpoint surface, a two-dimensional slate, a pre-arranged camera movement, and a combination or concatenation of two or more of the preceding transitional effects.

42. An apparatus, comprising:

a determination unit that determines that a viewpoint or virtual camera for viewing a model or scene has been interactively translated off of or to a pre-defined point or edge of a first camera 3D surface or viewpoint surface;

a transition unit, transitioning the viewpoint or virtual camera to a second camera 3D surface or viewpoint surface that is not adjacent to the first camera 3D surface or viewpoint surface;

a spatial navigation unit allowing a user to spatially move the viewpoint on the viewpoint surface;

a temporal navigation unit allowing a user to temporally control rewind and forward time control of a sequence of transition images;

displaying a transitional effect during the transitioning; and temporally controlling the displaying of the transitional effect, and wherein the transitional effect is at least one of a predetermined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

43. An apparatus, comprising:

a determining unit, determining that a viewpoint or virtual camera for viewing a model or scene has been interactively translated off of or to a pre-defined point or edge of a first camera 3D surface or viewpoint surface;

a transitioning unit, in response to the determining, transitioning the viewpoint or virtual camera to a second camera 3D surface or viewpoint surface that is not adjacent to the first camera surface or viewpoint surface;

a navigation unit enabling temporal navigation using rewind and forward time control of display of an animation during the transitioning;

a display unit displaying a transitional effect during the transitioning; and a control unit temporally controlling the displaying of the transitional effect, and wherein the transitional effect is at least one of a predetermined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

44. A method, comprising determining by a processor, that a viewpoint or virtual camera for viewing a model or scene has been interactively translated off of or to a pre-defined point or edge of a first camera 3D surface or viewpoint surface;

in response to the determining, transitioning the viewpoint or virtual camera to a second camera 3D surface or viewpoint surface that is not adjacent to the first camera 3D surface or viewpoint surface;

performing by the processor, temporal navigation control allowing rewind and forward time control and spatial navigation control of respective interrelated temporal and spatial images with a same interaction method;

displaying a transitional effect during the transitioning; and temporally controlling the displaying of the transitional effect, and wherein the transitional effect is at least one of a predetermined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

45. A method of navigation used when an environment allows time based control by controlling a time based speed and sign of a transition in the environment and allows position based spatial navigation control by controlling a position in the environment, comprising:

determining by a processor, that a viewpoint or virtual camera for viewing a model or scene has been interactively translated off of or to a pre-defined point or edge of a first camera 3D surface or viewpoint surface;

in response to the determining, transitioning the viewpoint or virtual camera to a second camera 3D surface or viewpoint surface that is not adjacent to the first camera 3D surface or viewpoint surface;

controlling by a processor, the time based display of a transitional effect using a same interaction method used for the position based spatial navigation control;

displaying a transitional effect during the transitioning; and temporally controlling the displaying of the transitional effect, and wherein the transitional effect is at least one of a pre-determined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

46. A method, comprising determining by a processor, that a viewpoint or virtual camera for viewing a model or scene has been interactively translated off of or to a pre-defined point or edge of a first camera 3D surface or viewpoint surface;

in response to the determining, transitioning the viewpoint or virtual camera to a second camera 3D surface or viewpoint surface that is not adjacent to the first camera 3D surface or viewpoint surface;

temporally controlling by a processor, display of a transitional effect by controlling a sign of time as well as a speed of time using same interaction method used for spatial navigation control;

displaying a transitional effect during the transitioning; and temporally controlling the displaying of the transitional effect, and wherein the transitional effect is at least one of a pre-determined video clip, an interpolation of the viewpoint or virtual camera moving from the first camera 3D surface to the second camera 3D surface, a two-dimensional slate, a pre-arranged camera movement, and a combination or concatenation of two or more of the preceding transitional effects.

* * * * *

UNITED STATES PATENT AND TRADEMARK OFFICE
CERTIFICATE OF CORRECTION

PATENT NO. : 7,589,732 B2
APPLICATION NO. : 10/287816
DATED : September 15, 2009
INVENTOR(S) : Azam Khan It is certified that error appears in the above-identified patent and that said Letters Patent is hereby corrected as shown below:

Title Page, Column 2 (U.S. Patent Documents), Line 1, change "Blakrishnan et al." --Balakrishnan et al.--.

Title Page, Column 2 (Other Publications), Line 1, after "Dagstuhl," insert --1997--.

Column 10, Lines 51-52, change "quarternion" to --quaternion--.

Column 20, Line 25, change "3d" to --3D--.

Column 20, Line 34, change "3d" to --3D--.

Column 20, Line 64, change "3d" to --3D--.

Signed and Sealed this

Twenty-second Day of December, 2009

David J. Kappos
*Director of the United States Patent and Trademark Office*